United States Patent
Li et al.

(10) Patent No.: US 12,538,185 B2
(45) Date of Patent: Jan. 27, 2026

(54) METHODS OF DELIVERY MODE SWITCH FOR MULTICAST AND BROADCAST SERVICE IN A 5G NETWORK

(71) Applicant: INTERDIGITAL PATENT HOLDINGS, INC., Wilmington, DE (US)

(72) Inventors: Hongkun Li, Malvern, PA (US); Michael Starsinic, Newtown, PA (US); Pascal Adjakple, Great Neck, NY (US); Quang Ly, North Wales, PA (US); Jiwan Ninglekhu, Royersford, PA (US); Catalina Mladin, Hatboro, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 277 days.

(21) Appl. No.: 17/904,022

(22) PCT Filed: Feb. 11, 2021

(86) PCT No.: PCT/US2021/017563
§ 371 (c)(1),
(2) Date: Aug. 11, 2022

(87) PCT Pub. No.: WO2021/163260
PCT Pub. Date: Aug. 19, 2021

(65) Prior Publication Data
US 2023/0345310 A1    Oct. 26, 2023

Related U.S. Application Data

(60) Provisional application No. 62/975,858, filed on Feb. 13, 2020.

(51) Int. Cl.
*H04W 36/00* (2009.01)
*H04W 72/30* (2023.01)
*H04W 76/40* (2018.01)

(52) U.S. Cl.
CPC ....... *H04W 36/0007* (2018.08); *H04W 72/30* (2023.01); *H04W 76/40* (2018.02)

(58) Field of Classification Search
CPC . H04W 36/0007; H04W 72/30; H04W 76/40; H04W 4/06
(Continued)

(56) References Cited

U.S. PATENT DOCUMENTS

| 9,319,851 B2 | 4/2016 | Yu et al. |
| 11,259,360 B2 * | 2/2022 | Saily ..................... H04W 48/20 |

(Continued)

FOREIGN PATENT DOCUMENTS

| CN | 103202040 A | 7/2013 |
| CN | 104871570 A | 8/2015 |

(Continued)

OTHER PUBLICATIONS

3GPP TR 23.757, "Study on architectural enhancements for 5G multicast-broadcast services", v0.2.0, 2019.
(Continued)

Primary Examiner — Jae Y Lee
Assistant Examiner — Haeshil Jessica Choi
(74) Attorney, Agent, or Firm — Flaster Greenberg P.C.

(57) ABSTRACT

An overall architecture to integrate multicast and broadcast service into a general 5G core network. The architecture may provide methods and systems to switch the delivery mode of transmitting messages to User Equipment (UE)s from a unicast mode to a multicast mode. The method includes triggering events at UE, network functions, content provider or RAN node to initiate the switch process; a
(Continued)

procedure for UE initiated switch from unicast to multicast; a procedure for network-initiated switch from unicast mode to multicast mode; and a procedure for RAN initiated switch from unicast mode to multicast mode. The architecture may also provide methods to switch the delivery mode from multicast mode to unicast mode. These methods may include triggering events at UE, network functions, content provider or RAN node to initiate the switch process; a procedure for UE initiated switch from multicast mode to unicast mode; a procedure for network-initiated switch from multicast mode to unicast mode; and a procedure for RAN initiated switch from multicast mode to unicast mode.

20 Claims, 20 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2013/0028118 | A1 | 1/2013 | Cherian et al. |
| 2013/0294320 | A1 | 11/2013 | Jactat et al. |
| 2016/0316398 | A1 | 10/2016 | Han et al. |
| 2017/0374581 | A1 | 12/2017 | Dao |
| 2018/0192289 | A1 | 7/2018 | Dao |
| 2019/0158985 | A1 | 5/2019 | Dao et al. |
| 2021/0075631 | A1* | 3/2021 | Liao ................. H04M 15/8038 |
| 2021/0076166 | A1* | 3/2021 | Navratil ................. H04W 4/08 |
| 2021/0105196 | A1* | 4/2021 | Dao ........................ H04L 47/24 |
| 2021/0219106 | A1* | 7/2021 | Li .......................... H04W 60/04 |
| 2022/0174119 | A1* | 6/2022 | Ge ........................ H04W 76/11 |
| 2022/0295236 | A1 | 9/2022 | Baek et al. |
| 2022/0329983 | A1 | 10/2022 | Jeong et al. |
| 2023/0027425 | A1 | 1/2023 | Zhu et al. |
| 2023/0029146 | A1 | 1/2023 | Kadiri et al. |
| 2023/0040690 | A1* | 2/2023 | Chen .................... H04L 5/0053 |
| 2023/0337326 | A1 | 10/2023 | Estevez et al. |

FOREIGN PATENT DOCUMENTS

| | | |
|---|---|---|
| CN | 108886669 A | 11/2018 |
| CN | 109417733 A | 3/2019 |
| WO | WO 2017/131690 A1 | 8/2017 |
| WO | WO 2019114939 A1 | 6/2019 |

OTHER PUBLICATIONS

3GPP TS 23.246, "Multimedia Broadcast/Multicast Service (MBMS) Architecture and functional description", Architecture and functional description (Release 16), stage 2, v16.1.0, 2019.
3GPP TS 23.468, "Group Communication System Enablers for LTE (GCSE_LTE)", Stage 2, v15.1.0, 2019.
3GPP TS 23.501, "System Architecture for the 5G System", Stage 2, v15.4.0, 2018.
3GPP TS 23.502, "Procedures for the 5G System", Stage 2, v15.4.1, 2019.
3GPP TS 26.346: Multimedia Broadcast/Multicast Service (MBMS); Protocols and codecs, v16.3.0, Dec. 2019.
3GPP TS 26.348, "Northbound Application Programming Interface (API) for Multimedia BroadcastlMulticast Service (MBMS) at the xMB reference point", v16.2.0, 2019.
SP-190625, "Revised SID: Architectural enhancements for 5G multicast-broadcast services", 2019.
3rd Generation Partnership Project, "Technical Specification Group Services and System Aspects; Study on architectural enhancements for 5G multicast-broadcast services," (Release 17), 3GPP Standard; Technical Report; 3GPP TR 23.757, 3rd Generation Partnership Project (3GPP), Mobile Competence Centre, 650, Route Des Lucio Les , F-06921 Sophia-Antipolis Cedex , France, vol. SA WG2, No. V0.3.0, Jan. 29, 2020, pp. 1-37.
Vivo et al, "Solution for unicast switch to multicast based on network control," 3GPP Draft, S2-2001358, 3rd Generation Partnership Project (3GPP), Mobile Competence Centre; 650, Route Des Lucioles ; F-06921 Sophia-Antipolis Cedex; France vol. SA WG2, No. Seoul, Korea; Jan. 13-17, 2020, pp. 4.
"Solution: Integrated MBS and Unicast Transport with Full Separation of MBS Service" Qualcomm Incorporated, SA WG2 Meeting #136, S2-1911371, Reno, Nevada, USA, Nov. 18-22, 2019, 6 pages.

* cited by examiner

METHODS OF DELIVERY MODE SWITCH FOR MULTICAST AND BROADCAST SERVICE IN A 5G NETWORK

CROSS-REFERENCE TO RELATED APPLICATIONS

This application is the National Stage Application of International Patent Application No. PCT/US2021/017563, filed Feb. 11, 2021, which claims the benefit of U.S. Provisional Patent Application No. 62/975,858, filed on Feb. 13, 2020, entitled "METHODS OF DELIVERY MODE SWITCH FOR MULTICAST AND BROADCAST SERVICE IN A 5G NETWORK," the contents of which are hereby incorporated by reference herein.

BACKGROUND

Switching between unicast delivery mode and multicast/broadcast delivery mode is supported in EPS MBMS via MooD and MBMS User Service Consumption Reporting. MooD is an application layer solution; thus, it presents the following inefficiencies.

Control signaling is transferred at application layer to enable the switch. It may not be efficient to transfer the control information at the application layer since many different applications will use the multicast/broadcast service. This approach may require all applications to support the MooD protocol. This approach is also prone to a slow reaction time to adjusting both core network and radio resource usage strategy to the prevailing resource usage status in either the core network or the radio network.

It may be more efficient to base the decision to switch between unicast and multi-cast on information that is not necessarily available at the application layer (e.g. RAN conditions, the number of devices that receiving the content, the location of the devices that are receiving the content, etc.).

Additionally, there is no legacy method that rely on non-access stratum (NAS) signaling between the UE and the network for delivery mode switching between unicast and multicast or between unicast and broadcast.

SUMMARY

System and methods that provide switching between at least two unicast messaging, multicast messaging, and broadcast messaging to a user device over a 5G network. The procedure may be performed in the manner. A determining is made whether a triggering event has occurred at one or more of a user device (e.g., UE), a network device, content provider system, or RAN node. The triggering event indicates a need to switch between a first one and a second one of unicast messaging, multicast messaging, and broadcast message. A switch, based upon the occurrence of the triggering event, from the first one of the unicast messaging, the multicast messaging, and the broadcast messaging to the second one of the unicast messaging, the multicast messaging, and the broadcast messaging to the user device is initiated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF THE DRAWINGS

Figure 4:
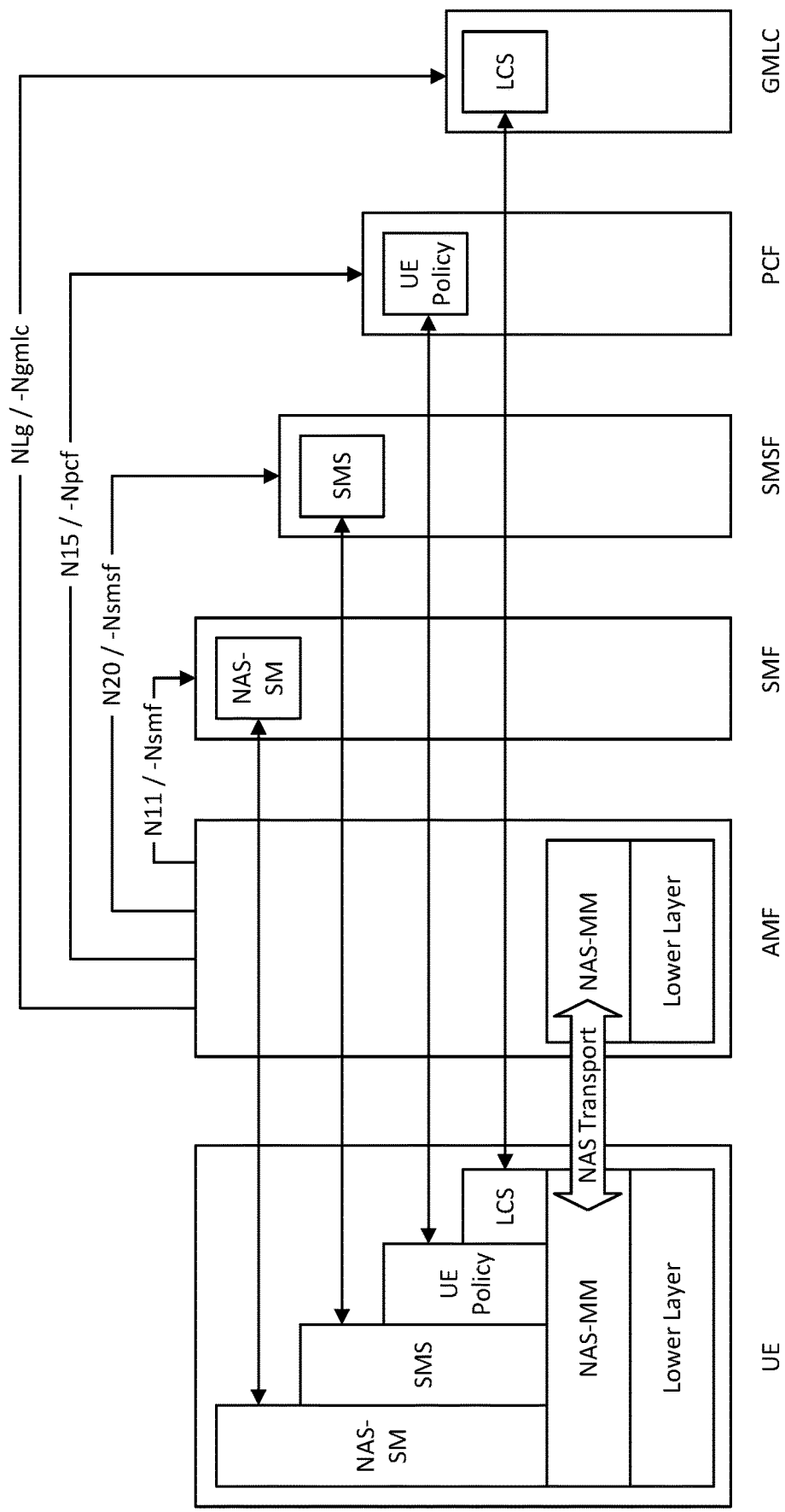

FIG. 4 conceptually illustrates NAS transport for SM, SMS, UE Policy and LCS.

Figure 5:
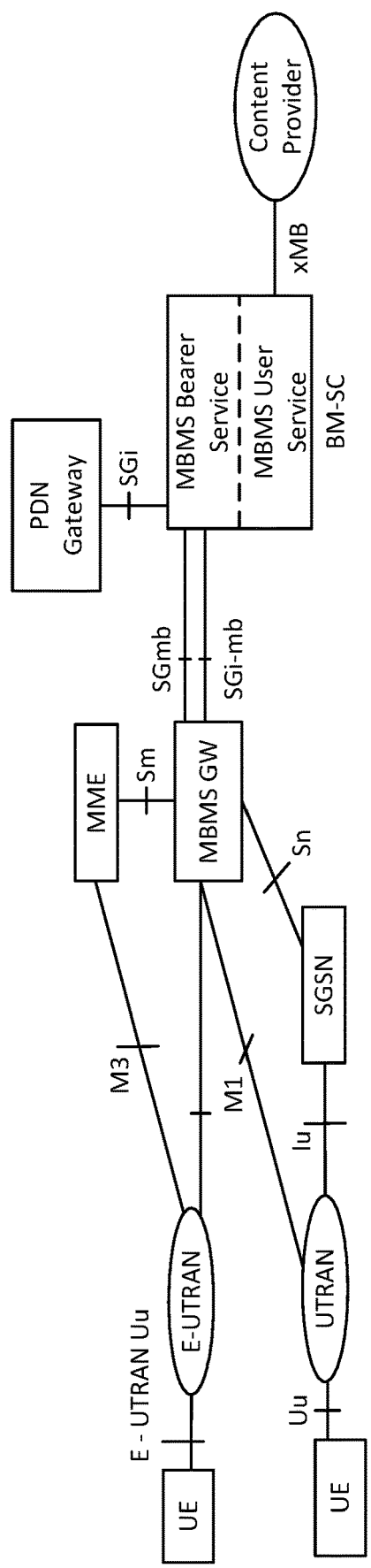

FIG. 5 illustrate a reference architecture for an evolved packet system with E-UTRAN and UTRAN (MBMS Broadcast Mode only) in TS 23.246.

Figure 6:
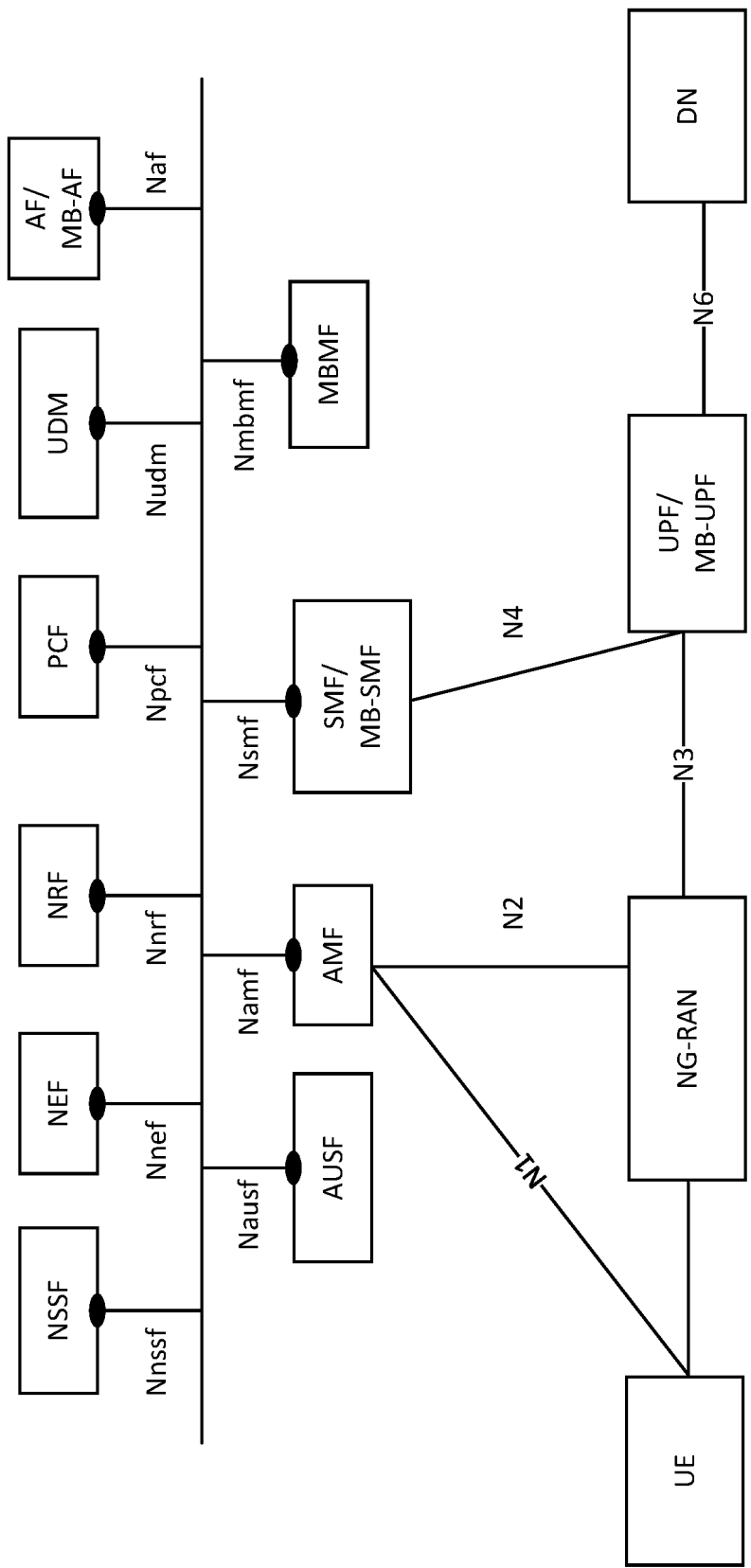

FIG. 6 illustrates a 5G MBS architecture.

Figure 7A:
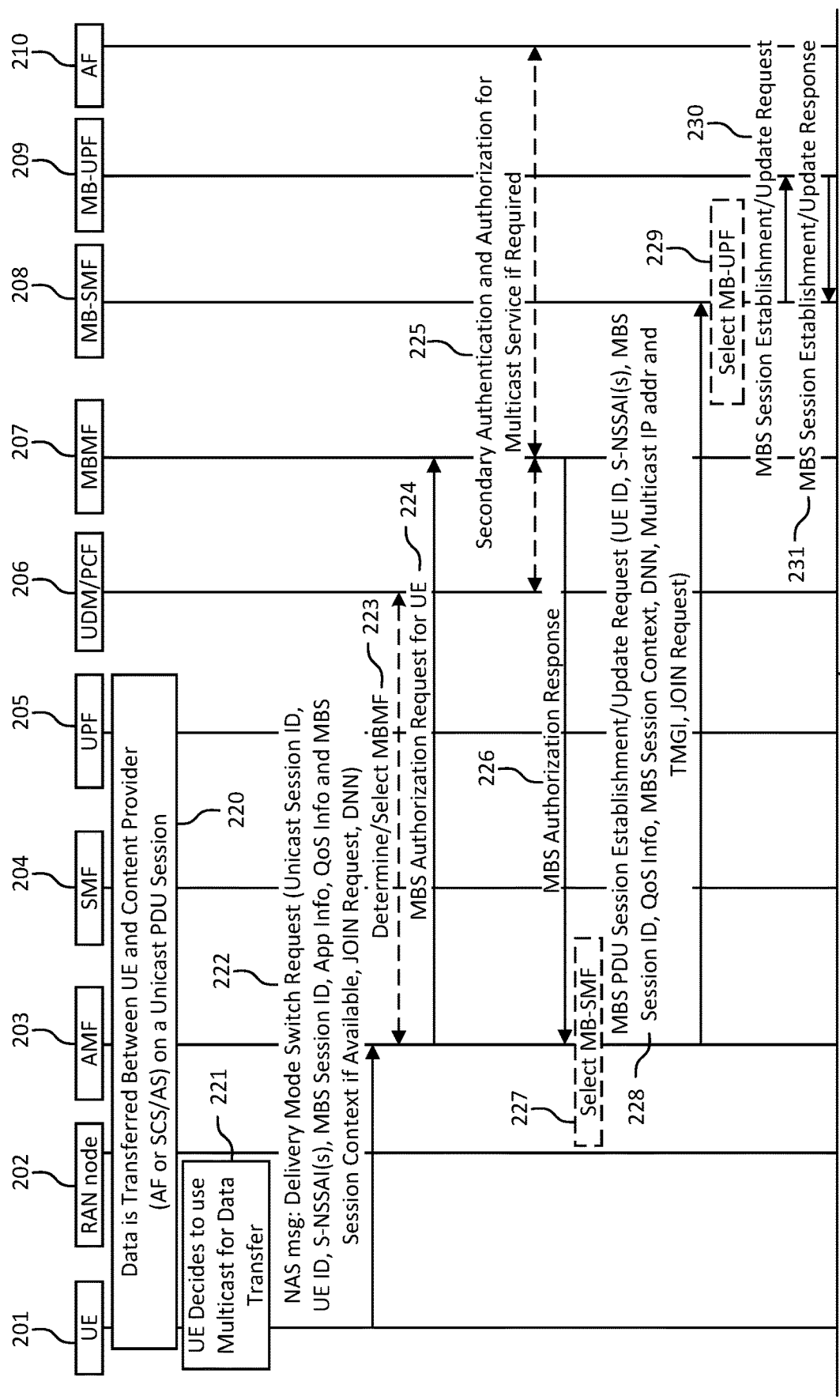

FIG. 7A illustrates a procedure of a UE initiated switch from unicast to multicast via a control plane.

Figure 7B:
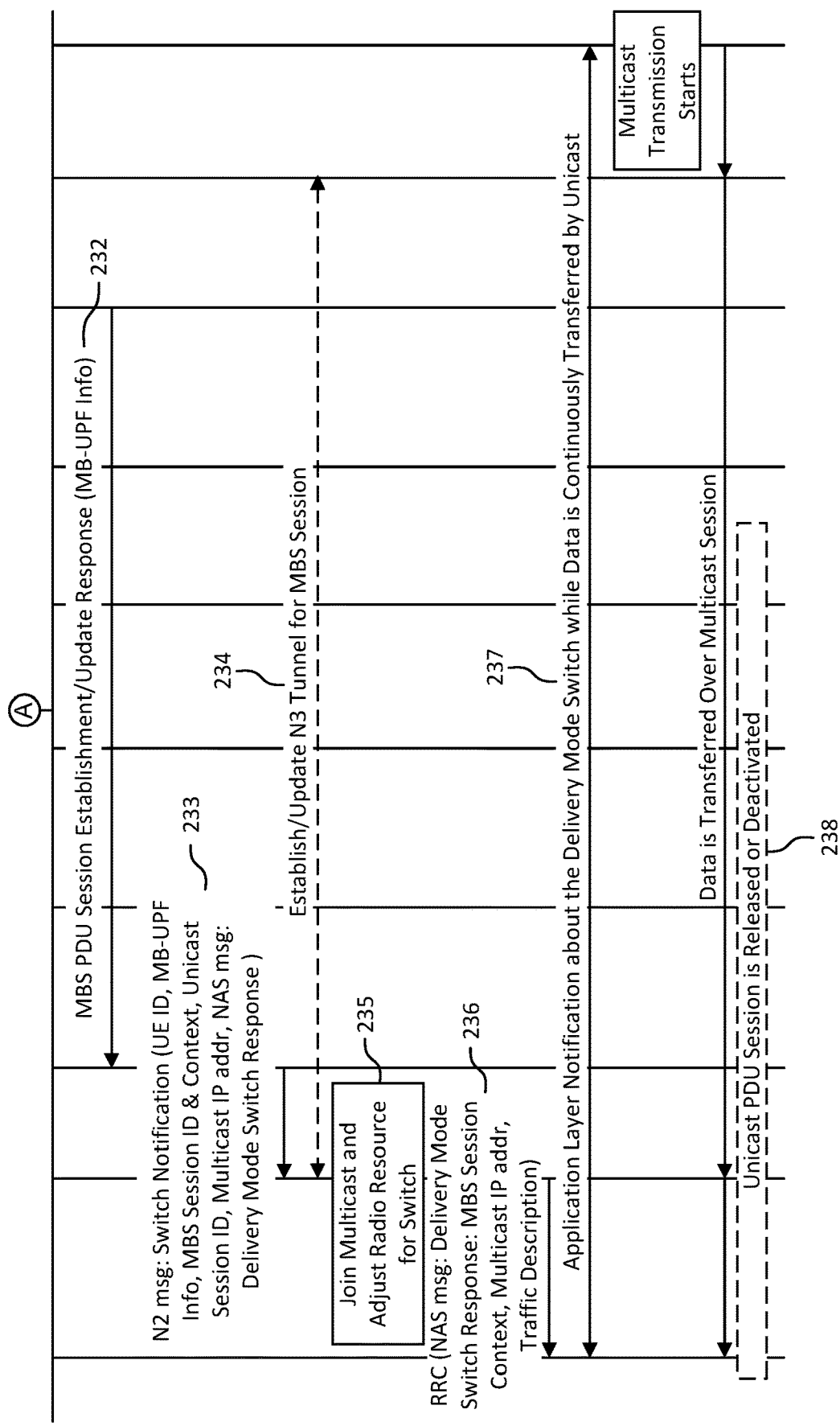

FIG. 7B illustrates a continued procedure of a UE initiated switch from unicast to multicast via a control plane.

Figure 8:
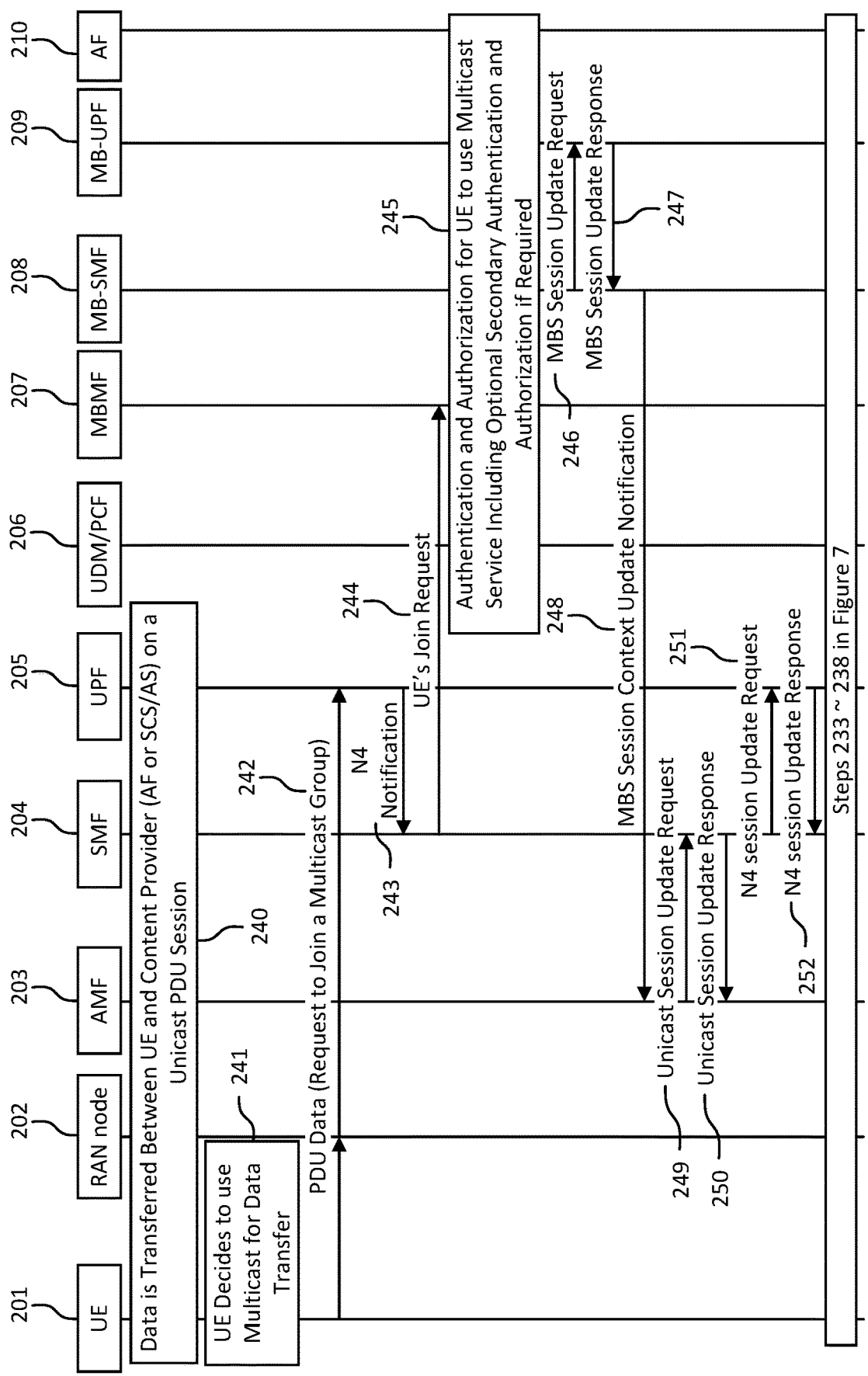

FIG. 8 illustrates a procedure of a UE initiated switch from unicast to multicast via a user plane.

Figure 9:
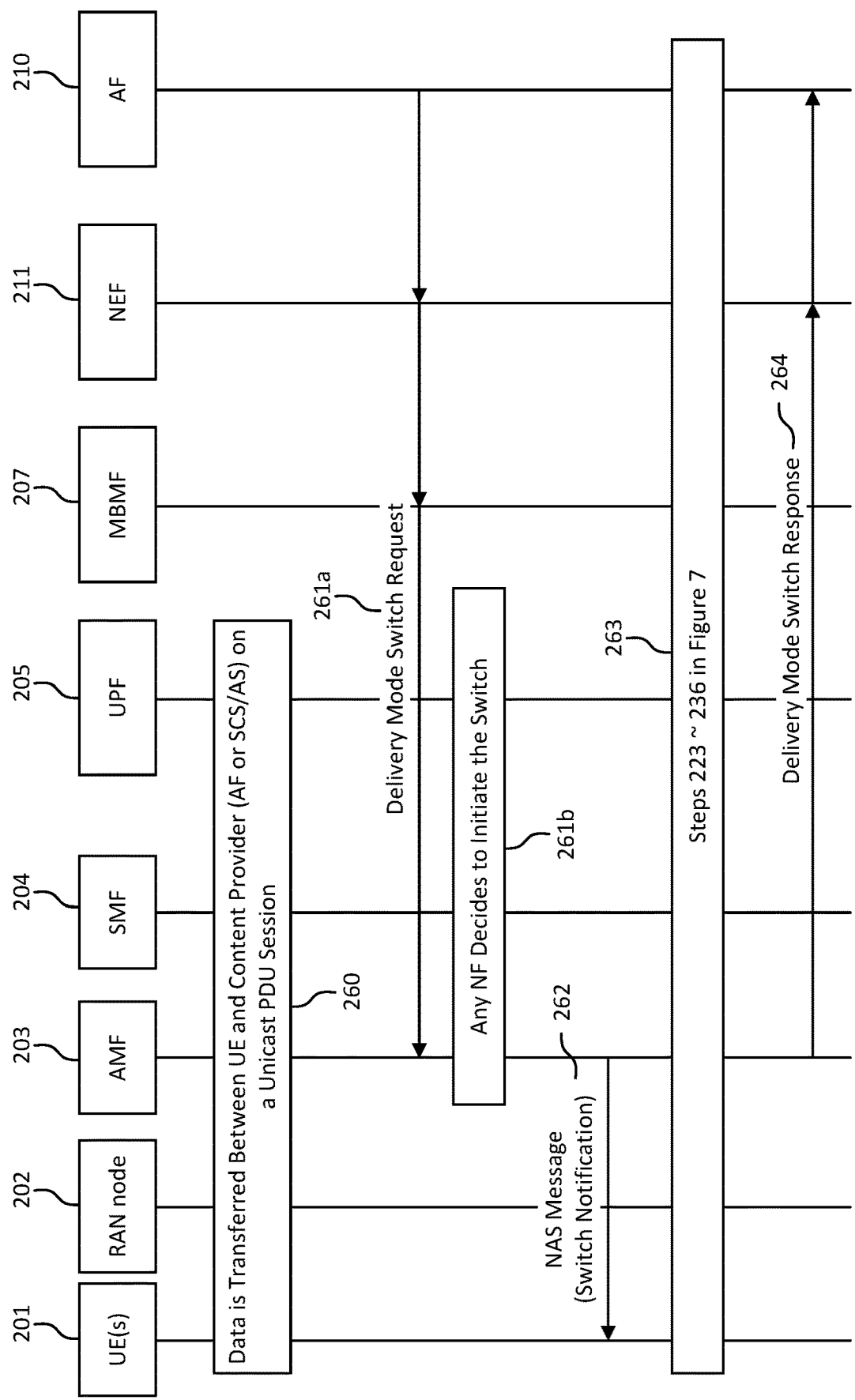

FIG. 9 illustrates a procedure for a network initiated switch from unicast to multicast.

Figure 10:
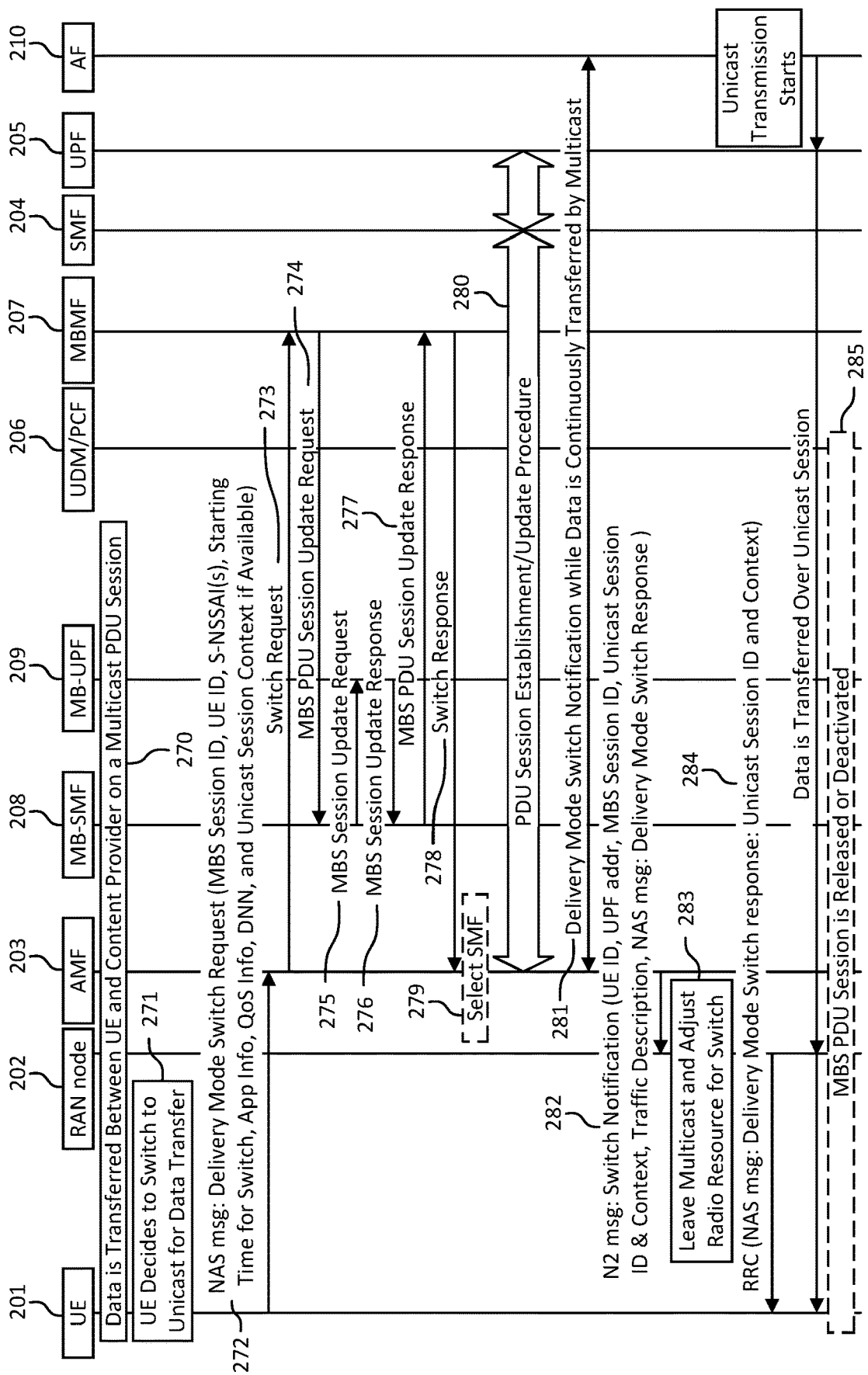

FIG. 10 illustrates a procedure for a UE initiated switch from multicast to unicast via a control plane.

Figure 11:
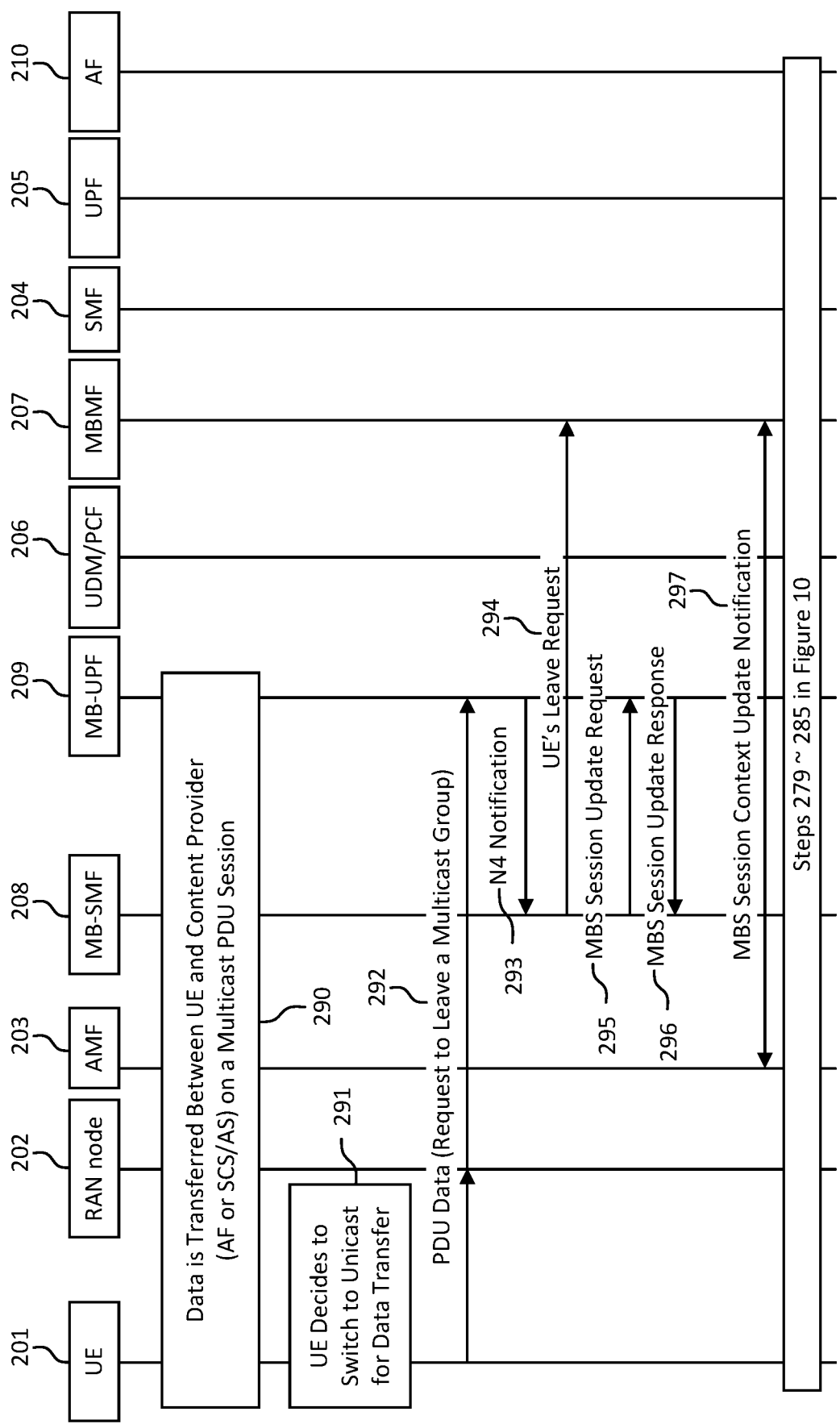

FIG. 11 illustrates a procedure for a UE initiated switch from multicast to unicast via user plane.

Figure 12:
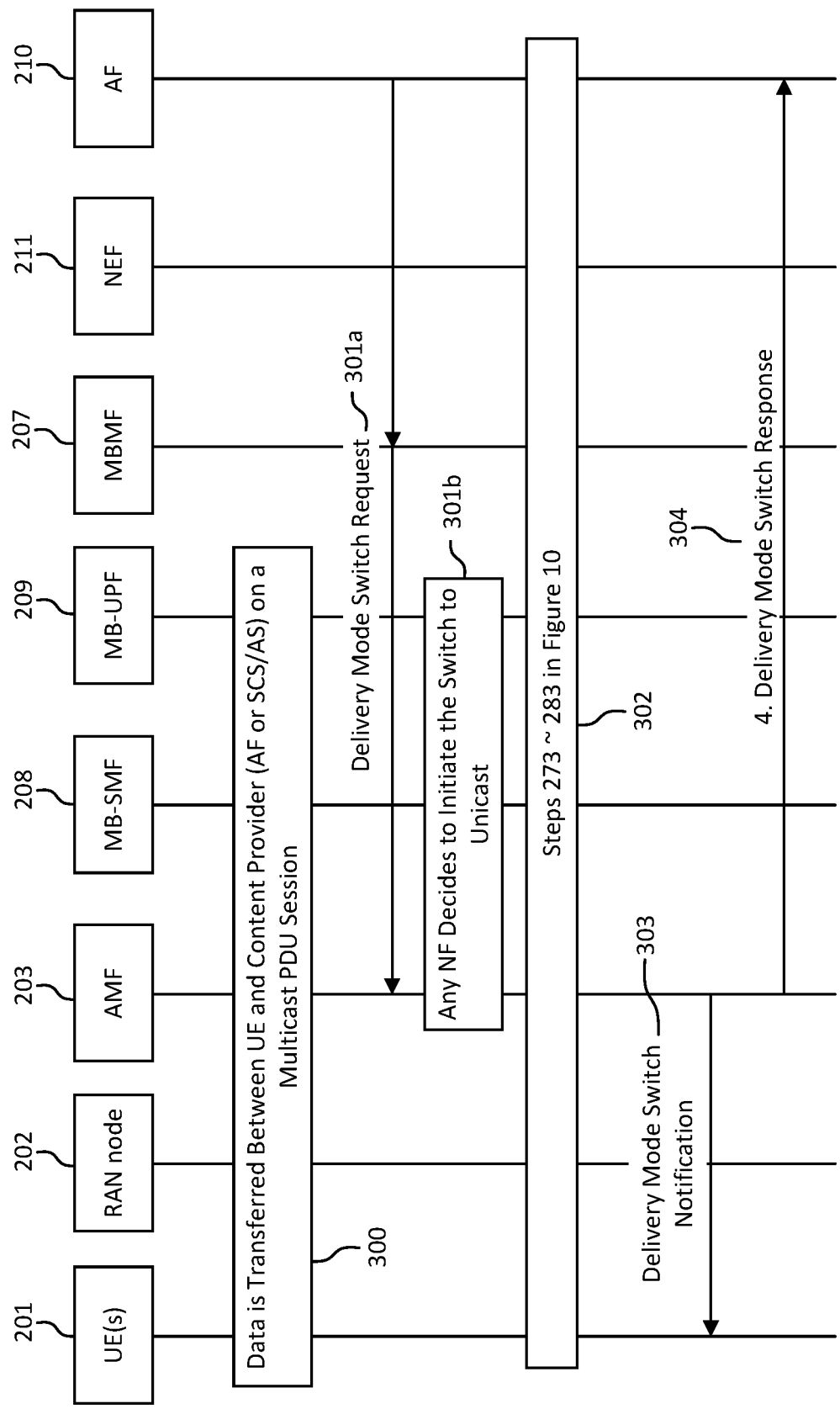

FIG. 12 illustrates a procedure for a network initiated switch from multicast to unicast.

Figure 13:
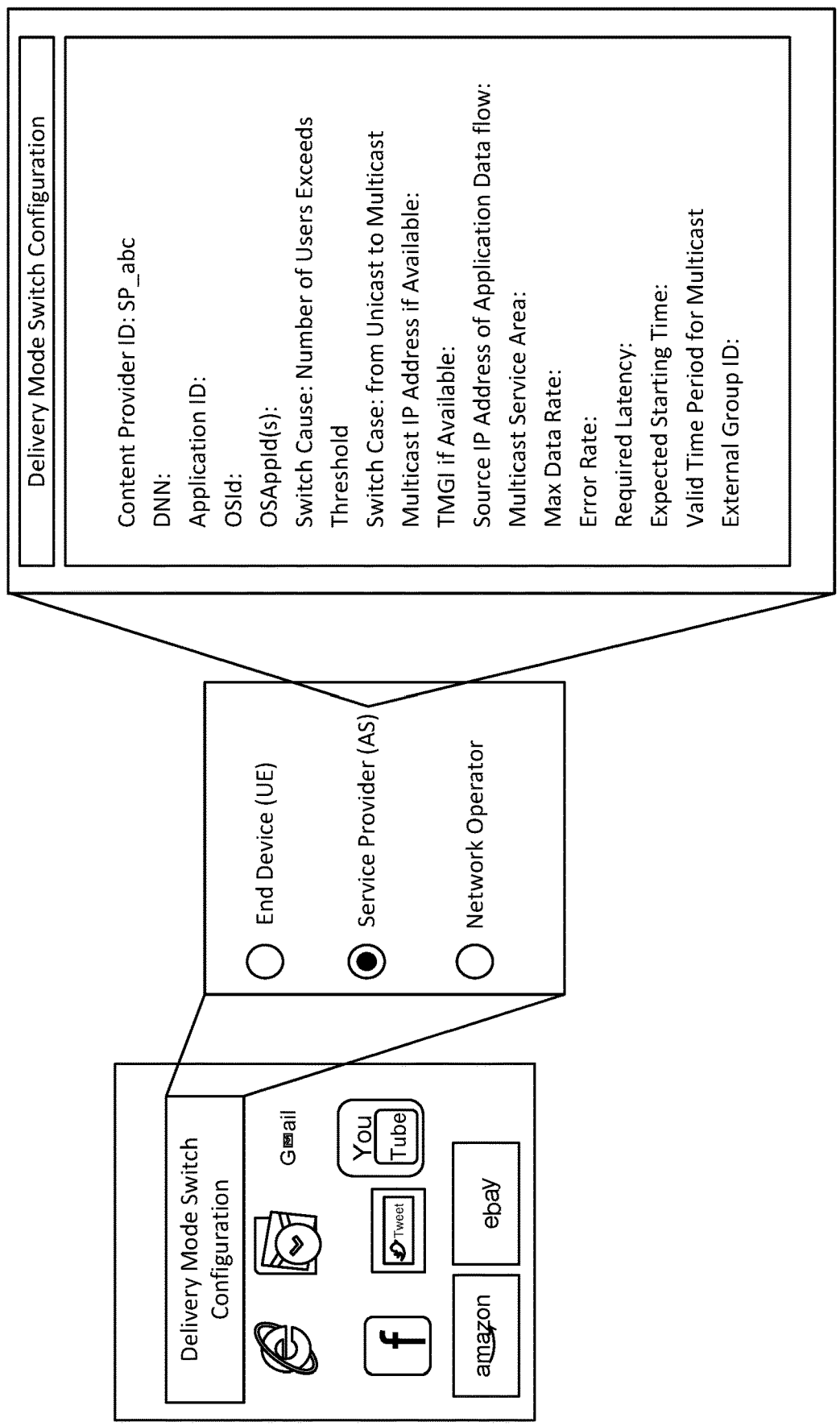

FIG. 13 illustrates a user interface presented by a user device.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 1A:
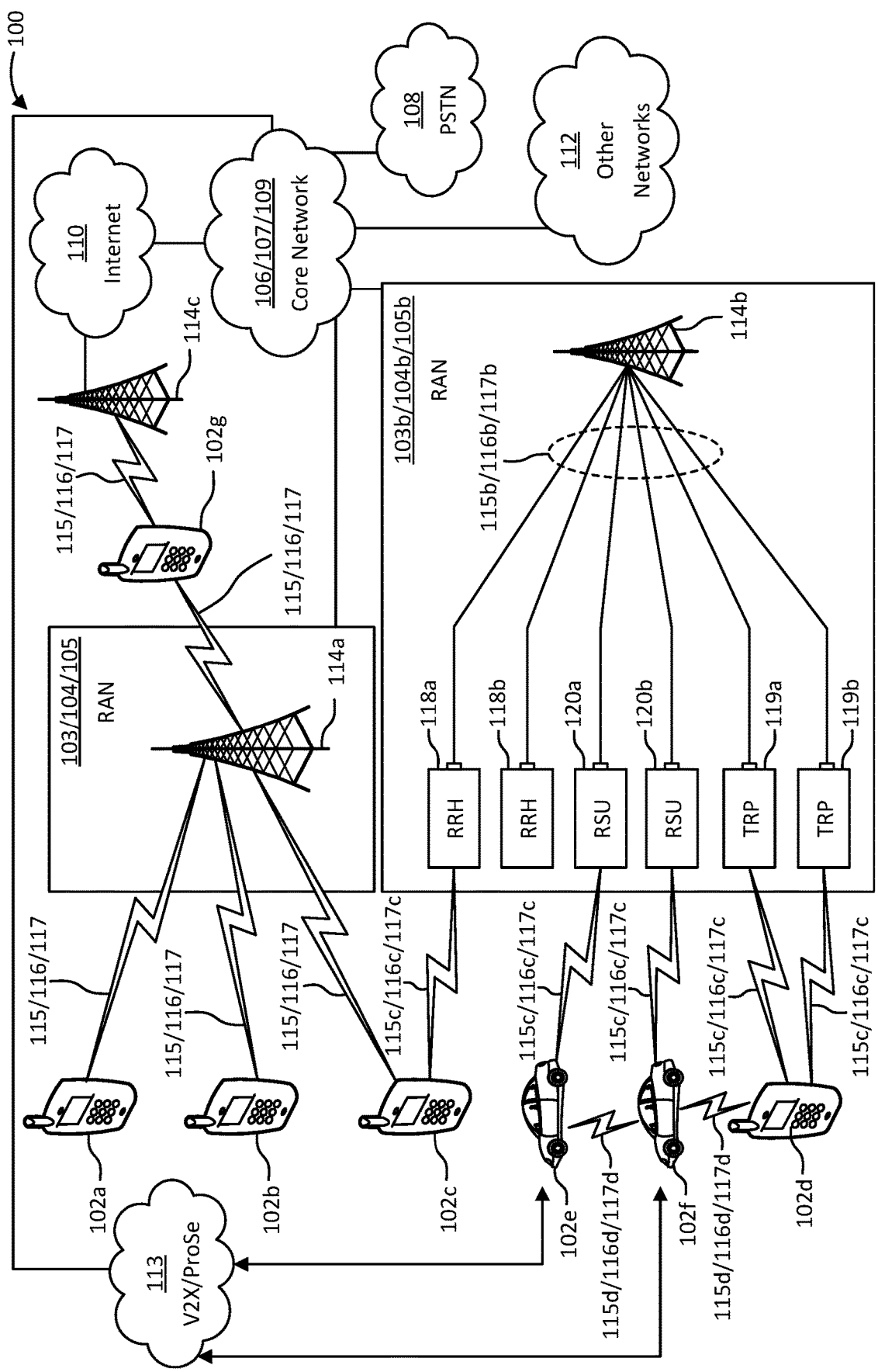
FIG. 1A illustrates an example communications system in which the methods and apparatuses described and claimed herein may be embodied.

FIG. 1A illustrates one embodiment of an example communications system 100 in which the methods and apparatuses of delivery mode switch for multicast and broadcast service in a network, such as the systems and methods illustrated in FIG. 1-FIG. 12 described and claimed herein may be used. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown) for methods, systems, and devices of delivery mode switch for multicast and broadcast service in a network. The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT). The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT)

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like, for implementing the methods systems, and devices of delivery mode switch for multicast and broadcast service in a network, as disclosed herein. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links for implementing methods, systems, and devices of delivery mode switch for multicast and broadcast service in a network. For example, the WTRU 102e shown in FIG. 1A may be configured to communicate with the base station 114a, which may employ a cellular-based radio technology, and with the base station 114c, which may employ an IEEE 802 radio technology.

Figure 1B:
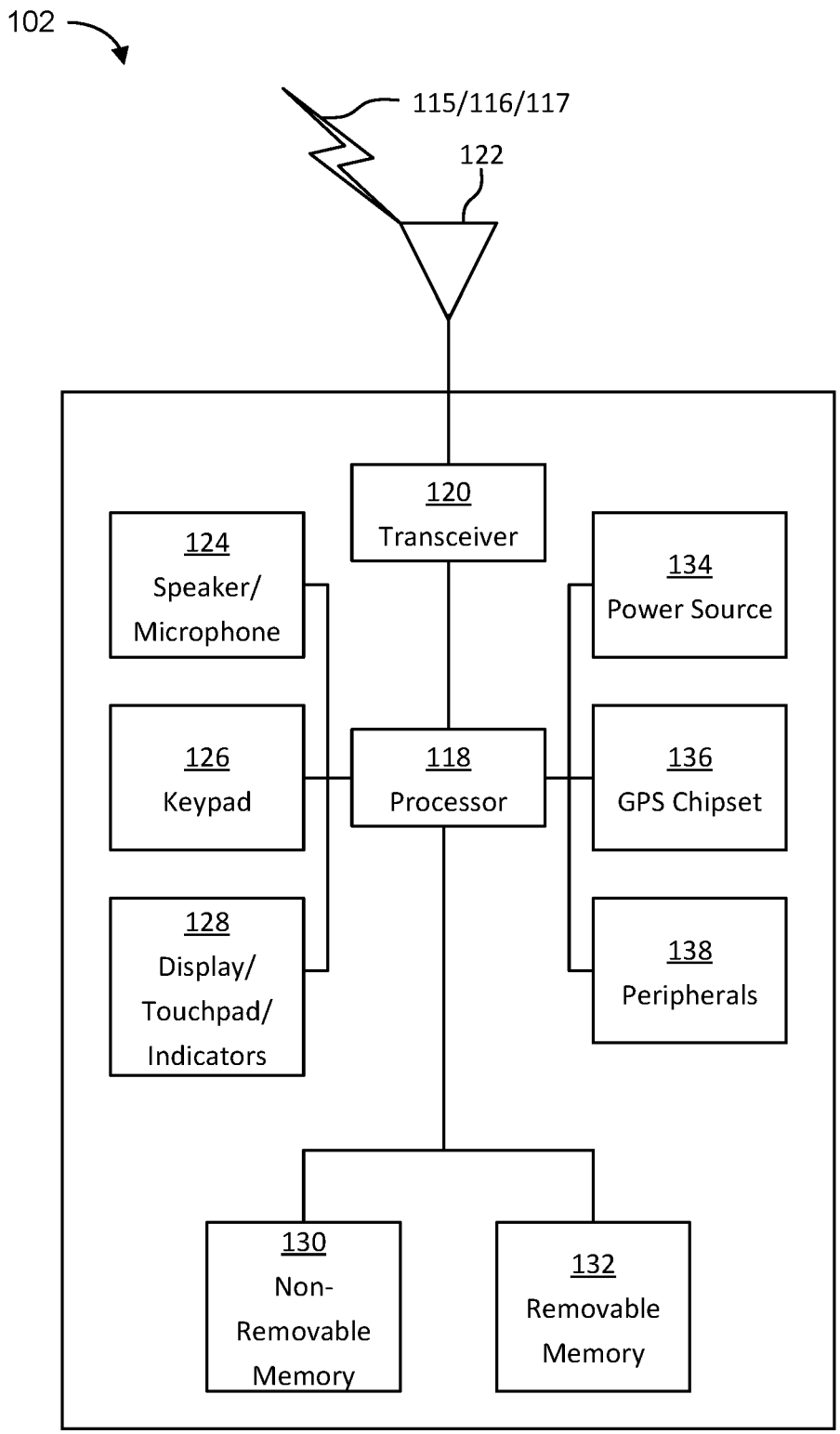
FIG. 1B illustrates a block diagram of an example apparatus or device configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
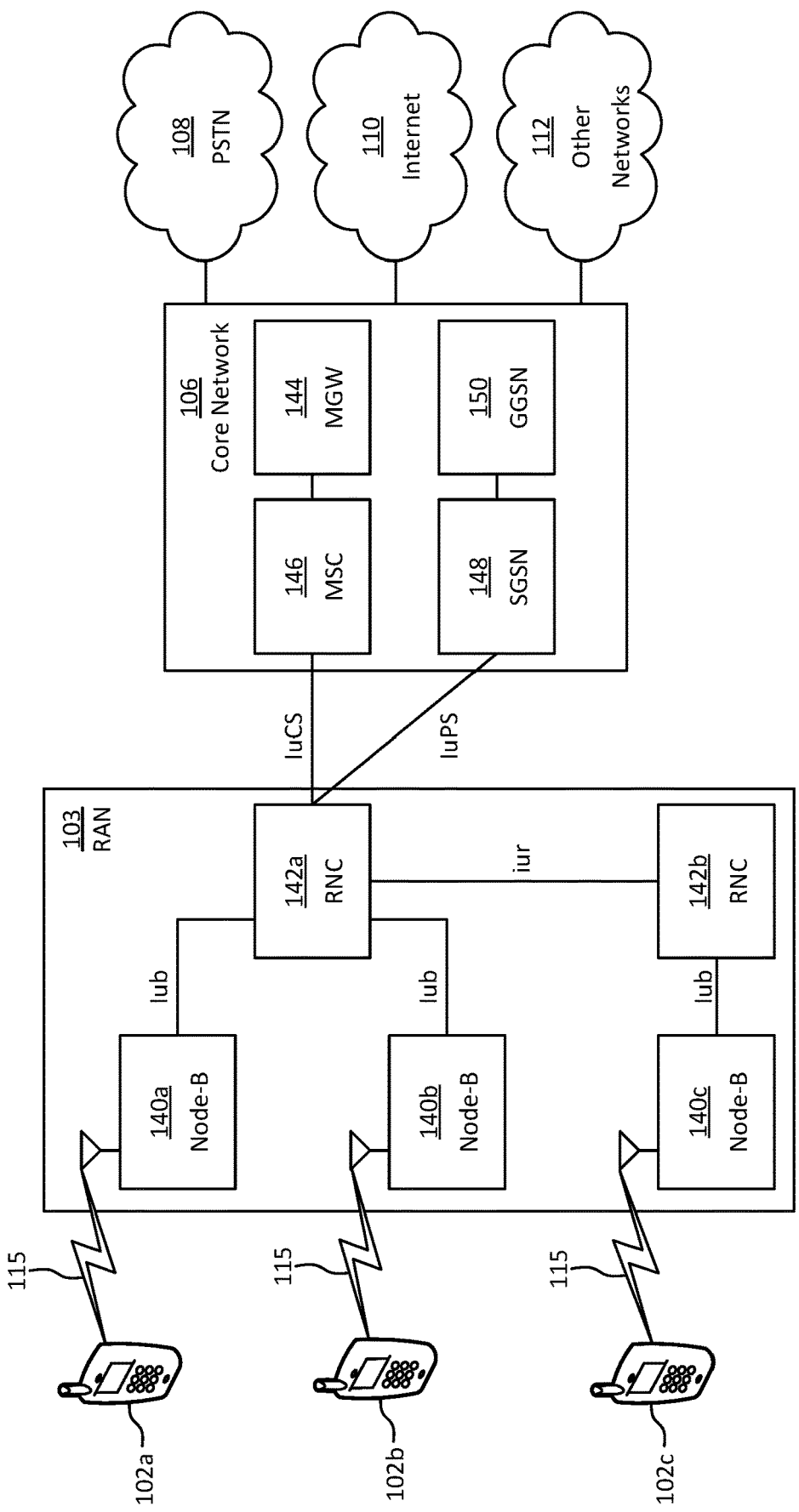
FIG. 1C illustrates a system diagram of an example radio access network (RAN) and core network.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iub interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
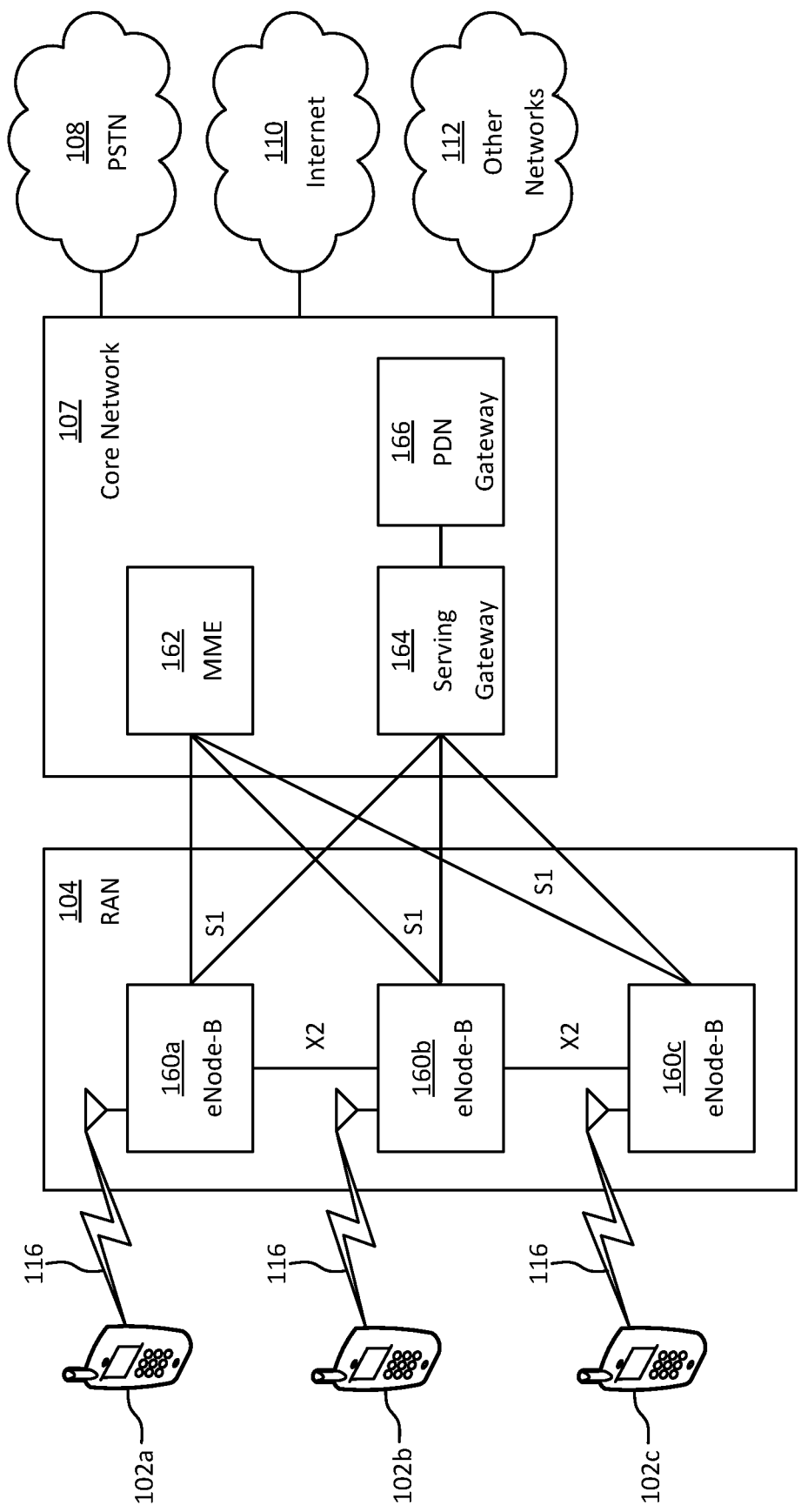
FIG. 1D illustrates a system diagram of another example RAN and core network.

FIG. 1D is a system diagram of the RAN 104 and the core network 107 that may implement methods, systems, and devices of delivery mode switch for multicast and broadcast service in a network, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
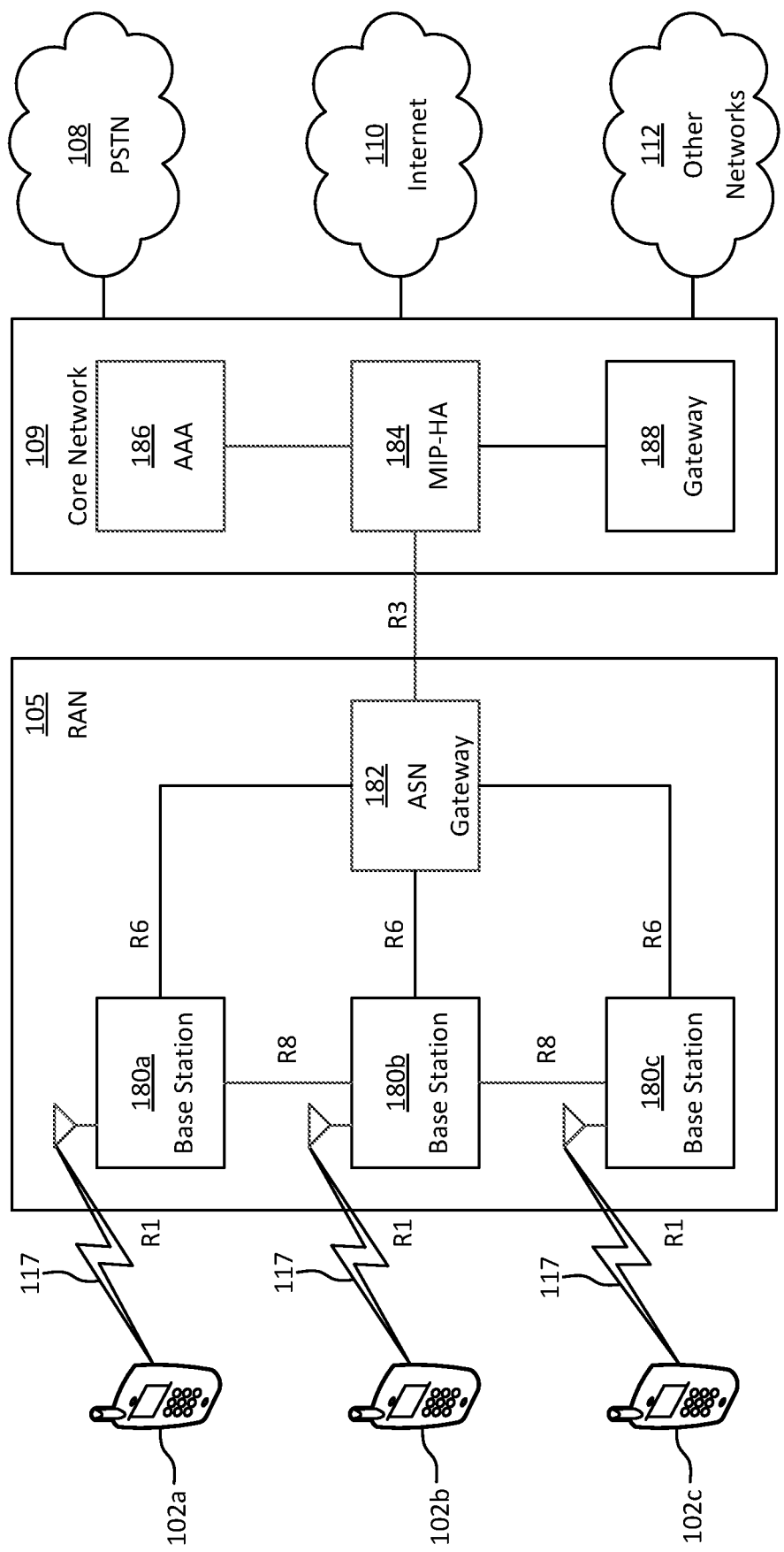
FIG. 1E is a system diagram of another example RAN and core network.

FIG. 1E is a system diagram of the RAN 105 and the core network 109 according to the methods, systems, and devices of delivery mode switch for multicast and broadcast service in a network, as disclosed herein. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
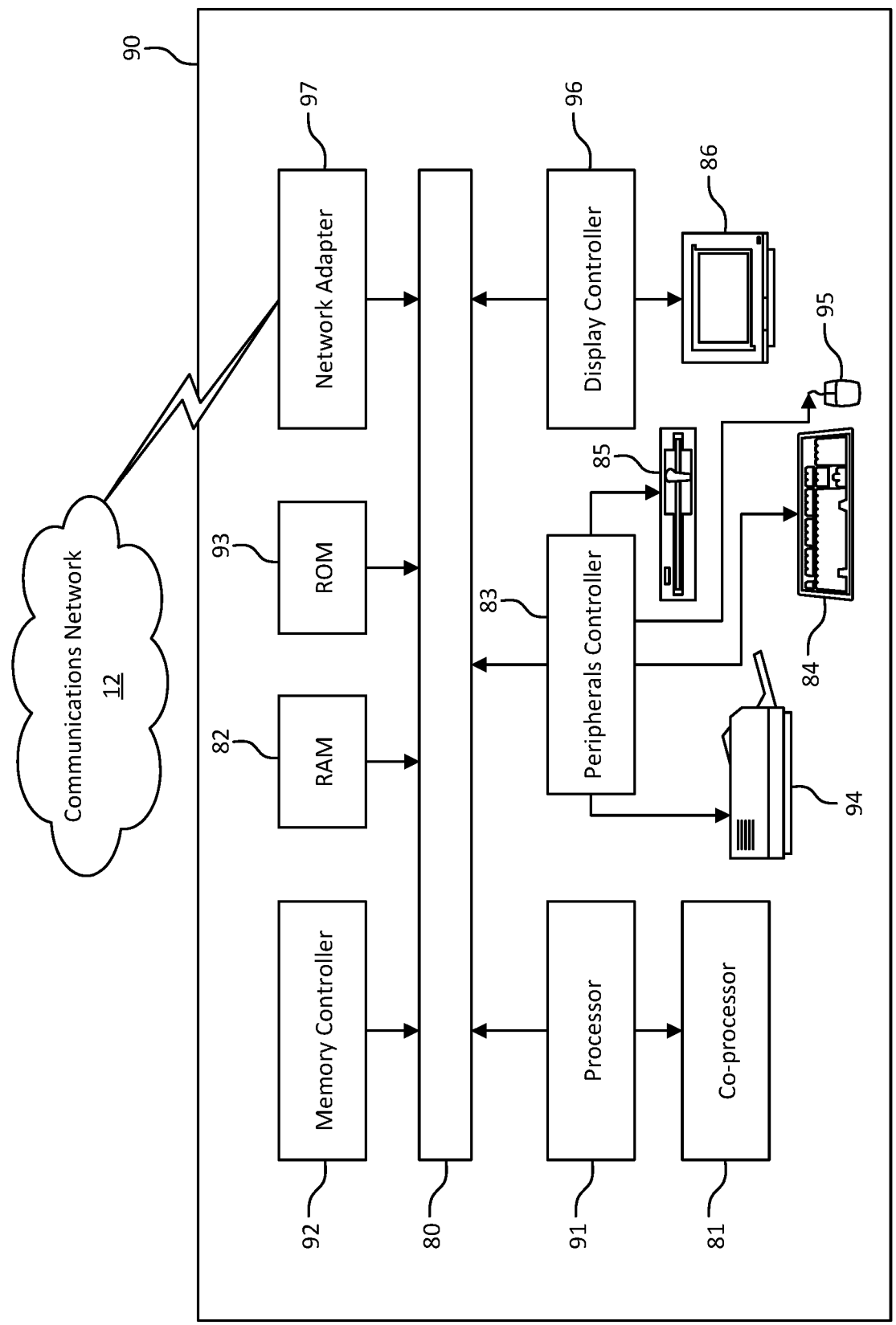
FIG. 1F illustrates a block diagram of an example computing system.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
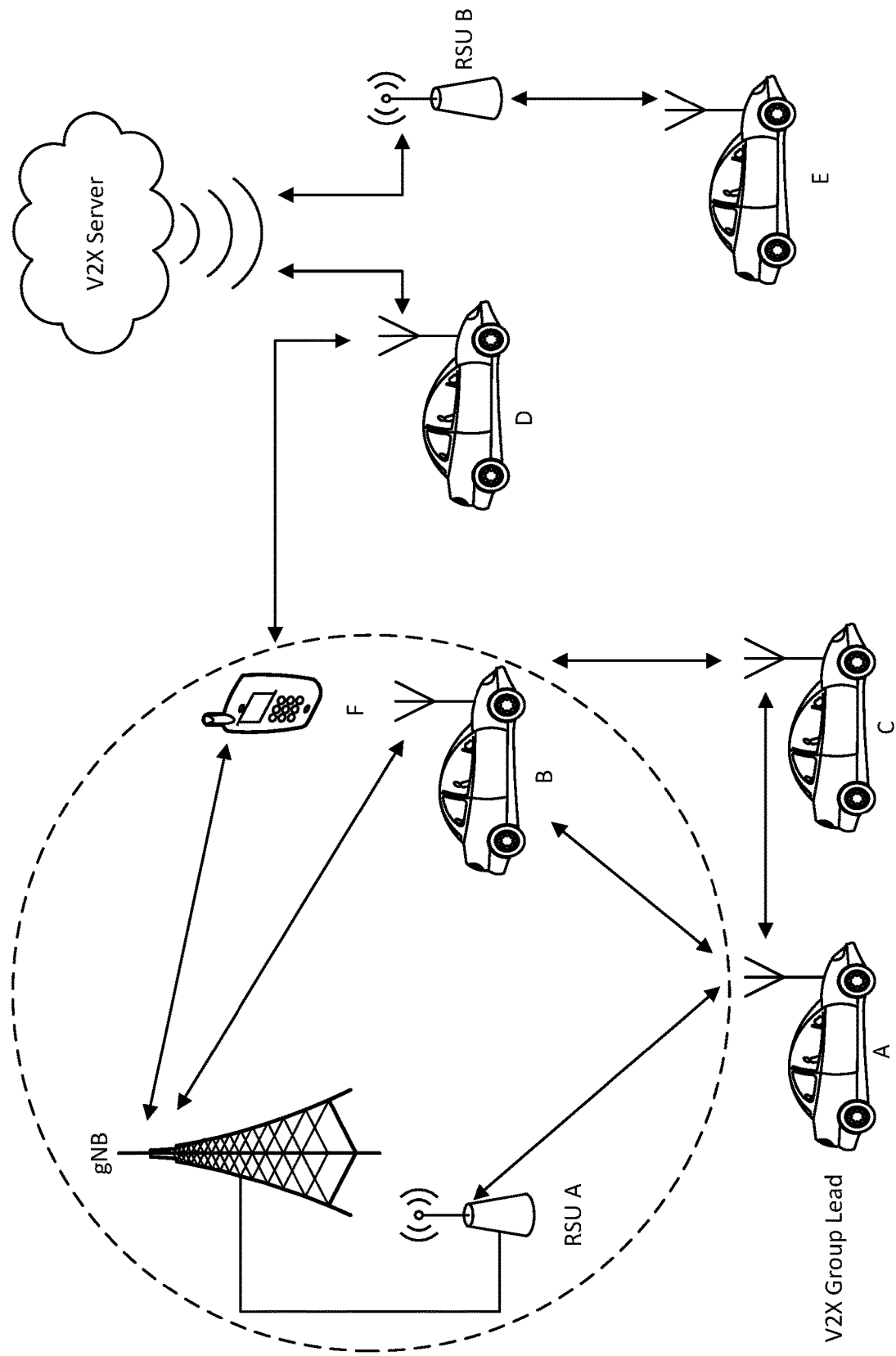
FIG. 1G illustrates a block diagram of another example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Figure 2:
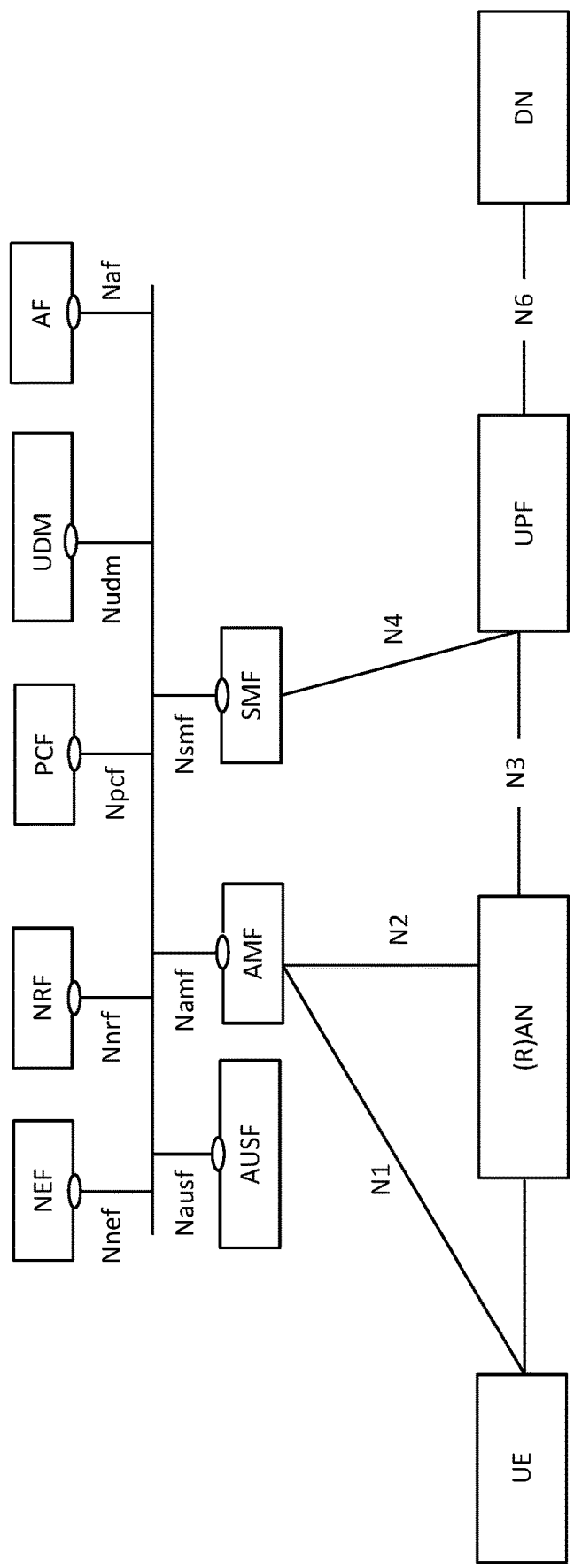
FIG. 2 illustrates a 5G system service-based architecture.

FIG. 2 shows the 5G System in the non-roaming reference architecture with service-based interfaces within the Control Plane.

Figure 3:
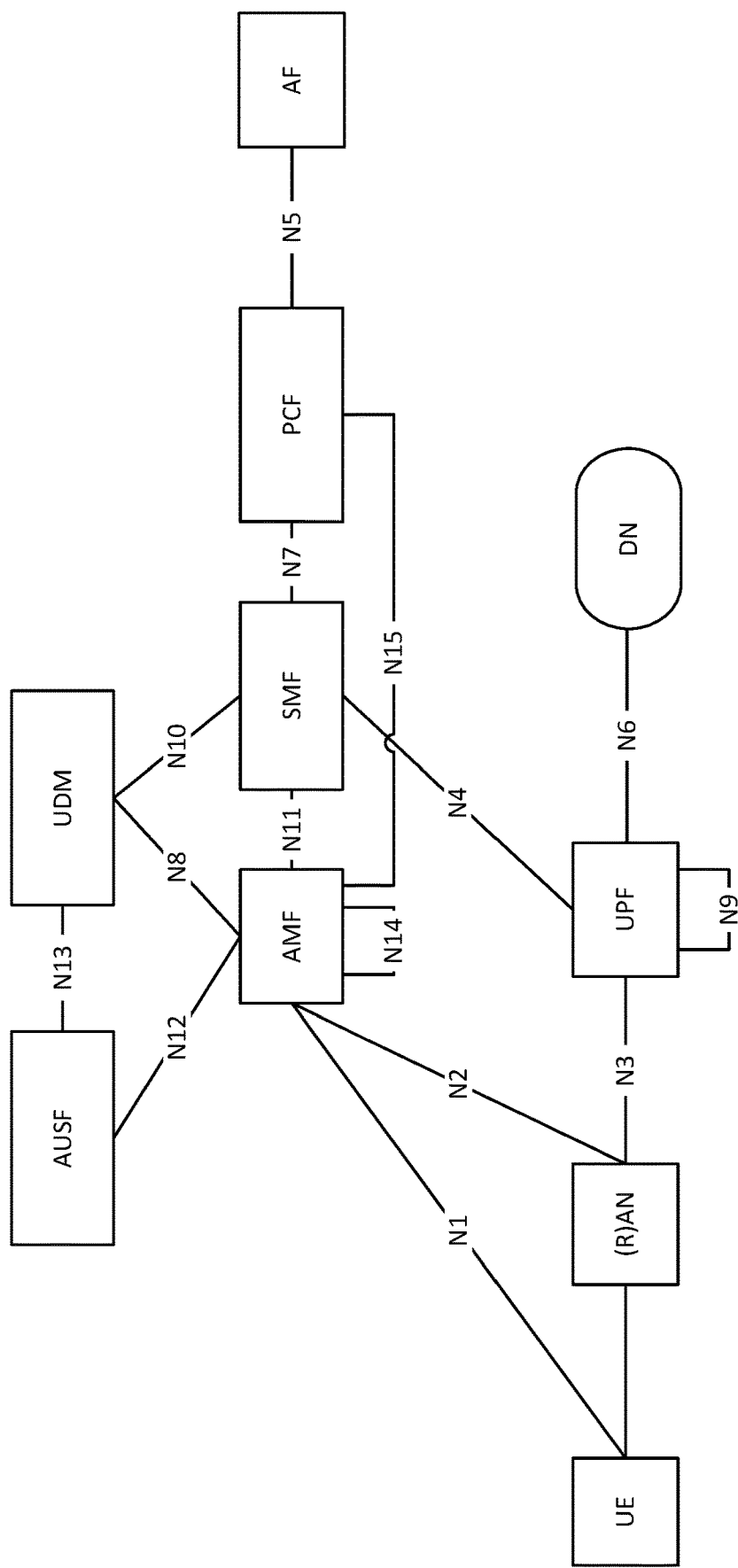
FIG. 3 illustrates a non-roaming 5G system architecture in reference point representation.

FIG. 3 depicts the 5G System architecture in the non-roaming case, using the reference point representation showing how various network functions interact with each other.

The end-to-end communications, between the Application in the UE and the Application in the external network, uses services provided by the 3GPP system, and optionally services provided by a Services Capability Server (SCS), which resides in the DN.

Control Plane Protocol Stack

FIG. 3 illustrates an exemplary NAS transport for SM, SMS, UE Policy, or LCS. It is worth noting that the mobility management and session management functions are separated. A single N1 NAS connection is used for both Registration Management and Connection Management (RM/CM) and for SM-related messages and procedures for a UE. The single N1 termination point is located in the AMF. The AMF forwards SM related NAS information to the SMF. AMF handles the Registration Management and Connection Management of NAS signaling exchanged with the UE, while SMF handles the Session management of NAS signaling exchanged with the UE.

In addition, the architecture defines several types of control signaling that can be transferred on top of NAS-MM protocol, such as UE policy between PCF and UE, Location Service (LCS) between Gateway Mobile Location Centre (GMLC) and UE.

eMBMS Architecture in LTE

The Multicast/Broadcast Multimedia Subsystem (MBMS) was originally developed for 3G networks for video broadcasting and streaming services and later introduced the eMBMS (evolved MBMS) for EPS. In Release 13 and Release 14, the MBMS system has been updated to support new services such as Public Safety, CIoT and V2X. FIG. 4 shows the MBMS architecture for EPS.

MBMS is a point-to-multipoint service in which data is transmitted from a single source entity to multiple recipients. Transmitting the same data to multiple recipients allows network resources to be shared. The MBMS bearer service offers two modes: Broadcast Mode and Multicast Mode.

In the EPS a functional entity MBMS GW exists at the edge between the CN and the BM-SC. In the bearer plane, this service provides delivery of IP Multicast datagrams from the Gi and SGi-mb reference points to UEs with a specified Quality of Service. An instance of the MBMS Bearer Service is identified by an IP Multicast Address and an APN Network Identifier. A TMGI also can be used to identify one MBMS Bearer Service inside one PLMN.

Broadcast-Multicast Service Center (BM-SC)

An MBMS specific functional entity named Broadcast Multicast Service Center (BM-SC) supports various MBMS user service specific services such as provisioning and delivery. Specifically, BM-SC is a functional entity, which includes the following main sub-functions: member function, session and transmission function, proxy and transport function, service announcement function, and security function.

Membership function: provides authorization for UEs requesting to activate an MBMS service. The Membership Function is an MBMS bearer service level function.

Session and Transmission function: manage MBMS session, allocate TMGI and schedule MBMS session transmissions.

Proxy and Transport function: proxy Agent for signaling over SGmb and Gmb reference points between MBMS GWs/GGSNs and other BM-SC sub-functions; and the Proxy and Transport Function is an MBMS bearer service function.

Service Announcement function: provide service announcements for multicast and broadcast MBMS user services; this function provides the UE with media descriptions specifying the media to be delivered as part of an MBMS user service (e.g., type of video and audio encodings). And this function is a user service level function.

Security function: MBMS user services may use the security functions for integrity and/or confidentiality protection of MBMS data; and the MBMS Security function is used for distributing MBMS keys (Key Distribution Function) to authorized UEs.

MBMS Gate Way (GW)

In the EPS, a functional entity MBMS GW exists at the edge between the CN and the BM-SC. MBMS GW provides the following functions. It provides an interface for entities using MBMS bearers through the SGi-mb (user plane) reference point. It provides an interface for entities using MBMS bearers through the SGmb (control plane) reference point. IP multicast distribution of MBMS user plane data to E-UTRAN (M1 reference point). In the case of E-UTRAN access, it may allocate an IPv4 or an IPv6 IP Multicast address, or both. An eNodeB should join to IP Multicast distribution using one IP Multicast address (either IPv4 or IPv6) to receive the MBMS data. When a single IP Multicast address is allocated by the MBMS-GW, this IP Multicast address together with the IP address of the multicast source (SSM) and a C-TEID is provided to the eNodeB via MME.

MBMS operation on Demand (MooD)

MBMS operation on Demand (MooD) allows certain content that is initially delivered over the unicast network to be turned into an MBMS User Service, in order to efficiently use network resources when the traffic exceeds a certain threshold. Specifically, certain content that is initially delivered over the unicast network may be turned into an MBMS User Service, in order to efficiently use network resources when the traffic volume exceeds a certain threshold. Such dynamic conversion from unicast delivery to MBMS delivery is also referred to as "MBMS offloading".

Two types of MBMS operation on Demand are described in TS 26.346: UE-Elected and Network-Elected offloading. In both types, there could be a network proxy/server to detect whether unicast traffic volume for the same service or content exceeds a certain threshold, and to indicate such occurrence to the BM-SC to enable MBMS offloading. In both types, there could be a network proxy/server to detect whether unicast traffic volume for the same service or content exceeds a certain threshold, and to indicate such occurrence to the BM-SC to enable MBMS offloading. To assist the MooD decision, the network proxy/server may obtain UE location from the UE per operator's policy. Alternatively, the network proxy/server may act as an Application Function in requesting from the PCRF, via the Rx reference point, the UE's location information. To assist the MooD decision, the network proxy/server may obtain UE location by many possible means as per the operator's policy, including use of the current location field in the MooD Header. MooD is supported for E-UTRAN and UTRAN accesses.

R17 Study on Architectural Enhancements for 5G-Multicast-Broadcast Services

A Release 17 study was started in SA2 to explore the potential enhancement for multicast and broadcast service in 5G network. Multicast and broadcast related specification work have not yet started for possible enhancements from system perspective in order to accomplish requirements for 5G network using the new 5GC architecture. The objectives have been identified as follows.

A first objective, define the framework, including the functional split between (R)AN and CN, to support multicast/broadcast services, e.g., ad-hoc multicast/broadcast streams, transparent IPv4/IPv6 multicast delivery, IPTV, software delivery over wireless, group communications and broadcast/multicast IoT applications, V2X applications, public safety.

A second objective, support for different levels of services (e.g., transport mode only vs. full-service mode).

A third objective, enable flexible (e.g., distributed vs. centralized) network deployment and operation (e.g., CP-UP separation).

And a fourth objective, address whether and how relevant QoS and PCC rules are applicable to multicast/broadcast services.

Key Issue on Reliable Delivery Mode Switching between Unicast and Multicast

In TR 23.757 [3], a key issue is identified to provide support for dynamic delivery mode switching in the 5GS. Depending on the number of devices receiving a specific content, their location, and RAN considerations, it may be necessary to support reliable and efficient delivery mode switching between unicast and multicast modes, i.e., to be able to dynamically transfer a unicast session to multicast delivery mode and vice versa. In addition, when a UE is receiving a multicast session, it may move across NG-RAN nodes and it is possible that the UE moves from a NG-RAN node that supports MBS to one that does not support MBS, or vice versa. The following aspects will be studied: 1) Triggers for delivery mode switching in 5GS; and 2) How delivery mode switching between unicast and multicast modes is performed in the 5GS (including the UE) while supporting service continuity.

Key Issue on Reliable Delivery Mode Switching between Unicast and Broadcast

In TR 23.757, a similar key issue is identified to provide support for dynamic delivery mode switching between unicast and broadcast in the 5GS. When a UE is receiving a session, it may move from a NG-RAN node that supports MBS to a NG-RAN node that does not support MBS, or vice versa. The following aspect will be studied: 1) triggers for switching between unicast and broadcast delivery methods; and 2) how switching between unicast and broadcast delivery methods is performed in the 5GS while supporting service continuity.

First Use Case: Switch Between Unicast and Multicast

In an example scenario, a user is using his smart phone (e.g., UE) to view a live video stream of an event. Initially, there is only one user who is streaming the live video stream, therefore the content provider or the network operator decides to establish a unicast session to transfer the video stream from the server to the smart phone through the mobile core network. Later, more users are interested in the same video stream and start the streaming service. When the number of smart phones exceeds a certain threshold, the network operator and content provider decide to start a multicast session to transfer the video stream data by multicast, so that all the smart phones can stream the video through one multicast session, which uses the network resources and radio resources more efficiently.

Sometime later, some UEs move to a new area, where the multicast service is not provided. The network operator or content provider will use a unicast session to stream the video for each of those UEs, and the remaining UEs will still stream live video via the multicast session if it is justified for network operator or content provider to continue the multicast service. For those affected UEs, they will switch to the unicast delivery method from multicast. At some point later in time, the number of UEs served through unicast delivery or the data volume delivered to the UEs for this service is such that it is no longer efficient to serve these UEs using unicast delivery mode. The UEs is then reconfigured to multicast mode reception.

Second Use Case: Switch between Unicast and Broadcast

A UE (e.g., user's mobile handset) is registered with a broadcast service providing streaming audio or visual content related to a local area, such as audio and visual guides to local attractions, traffic reports etc. Audio or visual information is distributed to the user's mobile handset by the broadcast service. The user is able to experience the content on her mobile device. The UE is able to initially receive the broadcast service continuously. Sometime later, the UE moves to a new area where the broadcast service is not provided or the broadcast of the service is no longer justified for e.g. the number of interested UEs or the number of UEs receiving the broadcast service no longer justify that the service to be broadcasted, for example from the network (for e.g. core network or radio network) resource efficiency perspective. The UE is then reconfigured to receive the service through unicast delivery. A some point later in time, the number of users (e.g., UEs) served through unicast delivery or the data volume delivered to the users for this service is such that it is no longer efficient to serve these users using unicast delivery mode. The UE is then reconfigured to broadcast mode reception.

Problems

Switching between unicast delivery mode and multicast/broadcast delivery mode is supported in EPS MBMS via MooD and MBMS User Service Consumption Reporting. MooD is an application layer solution; thus, it presents the following issues.

With reference to a first issue, control signaling is transferred at application layer to enable the switch. It is not efficient to transfer the control information at the application layer since many different applications will use the multicast/broadcast service, requiring all applications to support the MooD protocol, and also being prone to a slow reaction time to adjusting both core network and radio resource usage strategy to the prevailing resource usage status in either the core network or the radio network.

With reference to a second issue, it may be more efficient to base the decision to switch between unicast and multi-cast on information that is not necessarily available at the application layer (e.g. RAN conditions, the number of devices that receiving the content, the location of the devices that are receiving the content, etc.).

With reference to a third issue, additionally, there is no legacy method that rely on non-access stratum (NAS) signaling between the UE and the network for delivery mode switching between unicast and multicast or between unicast and broadcast.

Given the aforementioned issues, there is motivation to design the 5G or the like networks such that the decision to switch traffic flow between unicast delivery mode and multicast delivery mode may be made in the network below the application layer and triggered by the network, UE or RAN node.

In consideration of the problems discussed above, disclosed herein is subject matter that address following issues related to service delivery mode switching between multicast and unicast or between broadcast and unicast in 5G network. A first issue related to service delivery mode switching between multicast and unicast or between broadcast and unicast in 5G or the like networks is associated with what type of events will trigger a delivery mode switch between multicast and unicast. A second issue is associated with how switching between unicast and multicast/broadcast modes is performed in the 5GS while supporting service continuity. A third issue is associated with type of events will trigger delivery mode switch between broadcast and unicast.

Non-Access Stratum (NAS) centric solutions for delivery mode switching including Control Plane based procedures for delivery mode switching, or User Plane based procedures for delivery mode switching.

Techniques

The dynamic delivery mode switch between unicast and multicast can not only improve the network resource and radio resource usage efficiency, but also improve the user experience for the user at application layer (e.g., reduces latency, increases responsiveness, etc.). For example, it would be beneficial to use the multicast for the group gaming and group based V2X application to guarantee certain quality of service, such as data rate and error rate. However, as some devices moving in and out of multicast service area occasionally, it may be advantageous for network operator and content provider to deploy some mechanisms for enabling the dynamic switch between unicast and multicast.

With the 5G MBS expected to be widely implemented for a wide range of use cases and be integrated into general core network architecture, disclosed herein are methods and systems for the dynamic switch between unicast and multicast data transfer.

First, an overall architecture by integrating multicast and broadcast service into general 5G core network, the architecture being used as the baseline architecture for the systems and procedures disclosed herein.

Second, methods and systems to switch the delivery mode from unicast to multicast. For example, methods may describe: 1) triggering events at UE, network functions, content provider, or RAN node to initiate the switch process; 2) a procedure for UE initiated switch from unicast to multicast; 3) a procedure for network-initiated switch from unicast to multicast, or 4) a procedure for RAN initiated switch from unicast to multicast.

Third, methods and systems to switch the delivery mode from multicast to unicast. For example, methods may describe: 1) triggering events at UE, network functions, content provider or RAN node to initiate the switch process; 2) a procedure for UE initiated switch from multicast to unicast; 3) a procedure for network-initiated switch from multicast to unicast; or 4) a procedure for RAN initiated switch from multicast to unicast.

Fourth, methods and systems may describe delivery mode switch from the individual MBS traffic delivery to the shared MBS traffic delivery with handover.

Fifth, methods and systems may describe delivery mode switch from the shared MBS traffic delivery to the individual MBS traffic delivery with handover.

For purposes of this discussion, it may be assumed that the unicast and the multicast/broadcast sessions may (or may not) be available after switch. In other words, after the switch, application data may be transferred over unicast or MBS session, which may be determined by a UE or AF.

MBS Architecture for 5G Network

FIG. 6 illustrates an exemplary architecture to enable the multicast or broadcast service in 5G. Network functions introduced may include: Multicast and Broadcast Management Function (MBMF), MB-SMF, MB-UPF 209, or MB-AF.

Multicast and Broadcast Management Function (MBMF): responsible for managing the multicast and broadcast service provisioning to UE and content provider (e.g., it may implement membership functionality by forming a multicast group, and security functions such as authorizing a UE for joining a multicast group and using multicast service).

MB-SMF: responsible for managing MBS session for the multicast and broadcast data transfer. MB-UPF: serves as a data plane anchor point of an MBS session for multicast or broadcast. MB-AF: responsible for managing the MBS service as the application provider or content provider.

Note that the above functions are logical functions and can be implemented in other options. For example, functionalities of MBMF may be split and may be implemented at SMF, PCF, UPF and/or AF respectively.

It should be noted that although the solutions for service delivery mode switching are described in terms of switching between Unicast and Multicast by way of examples, it is understood that the approaches described hereinafter equally apply to switching between unicast and broadcast.

Methods of Switching from Unicast to Multicast Delivery

Delivery mode switch mentioned throughout the paper means 5GC switch the delivery method between 5GC Individual MBS traffic delivery and 5GC shared MBS traffic delivery to send the multicast/broadcast data to UE. This section presents the procedure of switching from unicast data transfer to multicast. There are multiple scenarios to consider when initiating the switch from unicast to multicast.

Scenario one is that the multicast session has not started yet and the UE switching needs to establish a multicast session. Scenario two is that the multicast session is already established and one or more UEs are receiving data through the multicast session. In other words, some UEs already joined the multicast group. In this case, the switching UE does not need to establish the multicast session.

Events Triggering Switching from Unicast to Multicast

A UE may request to switch a flow between unicast and multicast. The request may be triggered by the following events. In an example, an event may be moving to an area or a cell that supports multicast service. In another example, an event may be receiving an application layer or NAS layer message that indicates that a multicast service or multicast session is available or preferable (e.g., a V2X application running on UE joins a group, so the application may request to receive the application data over multicast session instead of unicast session). In another example, an event may be a user initiating an ad-hoc gaming session with friends via a GUI on a UE. In another example, an event may be UE subscription is changed to allow the UE to get MBS service.

The switch from unicast to multicast may be initiated by a core network function, including a request from an AF via the NEF. A core network function's decision to make the switch may be triggered by the following events. In an example, the core network function finds that the number of UEs receiving the same data content via respective unicast session exceeds a threshold number and decides to start the multicast data transfer for more efficient network resource usage. In an example, network functions such as UPF, PCF, SMF/MB-SMF, or NWDAF may also make the decision to switch. The decision may be based on the network function's monitoring of network status (e.g., the access network that is used to transfer the unicast data might be congested, so a network function may decide to switch an application flow to an available multicast session that carries the same application data for a group of UEs). In another example, a network function may detect, or be notified that a UE is moving into a multicast service area or predicted to move into the service area.

The switch from unicast to multicast may be initiated by the RAN node as well. For example, when a UE is moving into a new area where there is an existing multicast session set up for the ongoing unicast application data (e.g., group gaming or V2X application), RAN node may decide to switch the UE to a multicast session for more efficient radio resource utilization. This may happen along with the handover process where a different RAN node will provide multicast data transfer service to the UE.

UE Initiated Procedure

For UE initiated switching procedure, multiple methods are disclosed.

The first method is that the UE sends a NAS message to the AMF requesting to switch to the multicast transmission mode (e.g., a control plane method as shown in FIG. 7A-FIG. 7B). Multiple options are disclosed for the content of NAS message. First, the NAS message could be PDU session establishment request, where the UE indicates that the session is for multicast, so that the IP multicast address will be allocated later by the core network function, such as MBMF or MB-SMF. Alternatively, the NAS message may be a PDU session modification request indicating that UE would like to re-use an existing MBS PDU session to receive the multicast data through shared traffic delivery method. Second, the NAS message could also be service request message, where UE requests to activate and switch to an existing multicast session. In case that UE wants to switch to an existing active multicast session, UE can send a NAS-SM message to AMF/SMF and indicate the TMGI or IP multicast address in the NAS-SM message. Third, the NAS message may also include service consumption report such as MBMS user service consumption report. The service consumption reporting may include service consumption information. The NAS message may include service consumption information alone or in combination with service delivery mode switching request. The AMF may forward the service consumption report to the Broadcast Multicast Service Center (BM-SC) or to a network node acting as a BM-SC such as MBMF. It should be noted that the use of service consumption report in control plane as a means by the UE to trigger the network for the switch of delivery mode from unicast to MBMS service (broadcast or multicast) also equally applies to the switch from delivery via MBMS user service (broadcast or multicast) to unicast service. Fourth, and in support of MBMS operation on Demand (MooD), the NAS message may also include requests, for content eligible for conversion to delivery as an MBMS service (as described by the MooD Configuration Management Object (MO) based on the request domains, configured in the UE). This newly disclosed MooD request for conversion of a service received as a unicast service into an MBMS service may include information such as the one included in the similar MooD request currently exchanged between the UE and the network at the application layer. The AMF may forward the service consumption report to the Broadcast Multicast Service Center (BM-SC) or to a network node acting as a BM-SC, such as MBMF.

The second method is that the UE sends out a request message to UPF or to an MBMS Gateway (MBMS-GW) or a node acting as an MBMS-GW, or to a BM-SC or to a node acting as a BM-SC via user plane path to join an existing multicast group identified by an IP multicast address, (e.g., a user plane method). This is used for the case that UE wants to switch to an existing active multicast session. The content of the user plane message (for e.g. sent from a PDU layer within the UE) may also include service consumption report, such as MBMS user service consumption report. The service consumption reporting may include service consumption information. The NAS message may include service consumption information alone or in combination with service delivery mode switching request. Furthermore, in support of MBMS operation on Demand (MooD), the user plane message may also include requests, for content eligible for conversion to delivery as an MBMS service (as described by the MooD Configuration Management Object (MO) based on the request domains, configured in the UE). This newly disclosed MooD request for conversion of a service received as a unicast service into an MBMS service may include information such as the one included in the similar MooD request currently exchanged between the UE and the network at the application layer. Alternatively, the UE may send a Multicast Listener Delivery (MLD) request to join the existing multicast group.

FIG. 7A-FIG. 7B shows a procedure of a UE initiated switch from unicast to multicast.

Step 220: as a pre-requisite step, a unicast session is established, and data is transferred over the unicast session between UE 201 and AF 210 through the network. The data is sent from the UPF 205 to the UE 201 via a PDU Session.

Step 221: UE 201 receives information about the available multicast service and determines to switch the data transfer to multicast from unicast. This may be triggered by several factors as discussed herein.

Step 222: UE 201 sends a NAS message (e.g., a PDU session establishment/modification or service request) to AMF 203, which may include an indication of a delivery mode switch request. The message may include the following information which may have been received in step 221.

Information may include UE ID such as 5G-GUTI and SUPI.

Information may include PDU session ID and flow descriptor for the current unicast data transfer. The flow descriptor may be an IP 5-tuple.

Information may include DNN which indicate the data network that originates and/or terminates the data for multicast and unicast.

Information may include S-NSSAI(s) which indicate the network slice that UE 201 connects to for the unicast data transfer.

Information may include application information such as application ID indicating which application data may be delivered by multicast/unicast. Moreover, this may include operating system ID (OSId) and operating system application IDs (OSAppId(s)).

Information may include multicast session ID. If there is no existing multicast session, UE 201 generates this session ID. If UE 201 wants to join an existing multicast session, UE 201 provides this information. UE 201 can get such information by discovering the existing multicast service within an area during previous control plane procedures such as registration, registration update, service request procedure, or UE 201 stores the such information when the UE 201 is using the multicast service.

Information may include QoS information such as 5QI, QoS flow ID, maximum data rate, error rate, or maximum latency. Depending on whether the multicast session exists, these QoS information could be QoS parameters if it already exists, or the QoS requirements if there is no existing multicast session.

Information may include desired time instant that UE 201 would like to start receiving data from multicast session, e.g., when the switch takes effect.

Information may include multicast credentials. The UE 201 provides additional credentials needed to establish or join the multicast service or group.

Information may include multicast request context, which may be optional information needed by NFs to determine whether the request meets local policies, e.g. predicted UE 201 route or location.

If the UE 201 wants to switch to an existing multicast session, more information may be included. More information may include multicast IP address which is the identity that identifies the multicast session/group. More information may include other MBS session context information UE 201 has such as MB-SMF address, S-NSSAI identifying the network slice that is serving the multicast session, multicast session service area, and maximum multicast data rate. More information may include TMGI identifying the multicast group that UE 201 wants to join. More information may include Multicast Session ID or Reference ID that was received in an advertisement for the Multicast session.

Step 223: If AMF 203 does not know MBMF 207 information or UE 201 does not provide such information, AMF 203 may use a default MBMF or communicate with NSSF/UDM to receive assistance for determining and selecting MBMF 207.

In case of AMF 203 change is required, the new AMF 203 is responsible for handling the control signaling that are shown in FIG. 7A.

Step 224: AMF 203 sends request to the MBMF 207 check whether the requesting UE is authorized to use the multicast service or multicast/broadcast service (MBS).

Step 225: in case that the secondary authentication and authorization is required by AF 210 for the specific application data transfer by multicast, MBMF 207 is responsible for communicating with AF 210. In addition, UDM 206 or PCF 206 may also be involved in this procedure. This could be specific to UE 201, the application, the Multicast/Broadcast Service (MBS), or a combination of these. AMF 203 can contact AUSF to determine if the Secondary Authentication and Authorization is needed regarding the multicast service for the application data flow. MBS service is a service that 5G core network provides.

Step 226: MBMF 207 sends authorization response to AMF 203 to indicate the result. In addition, the MBMF assigns a TMGI to identify the multicast group if it does not exist yet, and sends it to AMF 203 along with the MB-SMF information such as MB-SMF address or ID. In addition, MBMF 207 may assign a multicast IP address to the group. Multicast group includes a group of UEs that will join the group and receive the data via multicast. Multicast session (e.g., multicast PDU session) is the PDU session established for multicast.

Step 227: If the multicast session does not exist yet, AMF 203 may select an appropriate MB-SMF 208 to establish and manage a multicast PDU session. If the MBMF 207 had provided the MB-SMF address or ID, the AMF 203 selects the indicated MB-SMF 208.

Step 228: AMF 203 sends MBS session establishment message or update request message to the selected MB-SMF 208 depending on whether the MBS session exists. If the session does not exist, the request may include the information such as UE ID, session ID, QoS flow ID and corresponding QoS information (e.g., 5G QoS Indicator (5QI), QoS requirements such as maximum data rate per QoS flow or per MBS session, maximum latency, or error rate), traffic description (e.g., application ID, OSId, or OSAppId(s)), TMGI, or DNN. Note that there may be multiple QoS flows in an MBS session, and each QoS flow may be used to transfer different multicast application data. If the session already exists and UE 201 wants to join the group, the multicast IP address and the MBS session service area may be included as well. In addition, the time instant about when the switch may take effect may be sent to MB-SMF 208, e.g., when the UE 201 may be start receiving data over multicast, and stop receiving over unicast session. Another option is to let MBSF select the MB-SMF 208/SMF 204 for MBS PDU session, and then the AMF 203 forwards the session establishment/modification message from UE 201 to the MBSF. MBSF then sends the message to the selected MB-SMF 208/SMF 204 to perform the requested session management process.

Step 229: MB-SMF 208 selects a MB-UPF 209 in case that a new MBS session is to be established. Moreover, MB-SMF 208 may allocate a multicast IP address to identify the new MBS session for multicast transmission. If MB-SMF 208 co-locates with a SMF 204, then the SMF 204 may assign the multicast IP address.

Step 230: MB-SMF 208 sends session establishment or update request to MB-UPF 209 with the information mentioned in step 222 and step 228. Some information (e.g., DNN, application information/traffic description, source IP address, or multicast IP address/TMGI) may be used as packet filter rules associated with the MBS session by the MB-UPF 209. In addition, MB-SMF 208 may indicate to MB-UPF 209 whether the new MBS session is used for multicast or broadcast.

Step 231: MB-UPF 209 returns session establishment or update response message to MB-SMF 208 to indicate that MBS session is ready for the UE 201. If MB-SMF 208 had not allocated a multicast address, the MB-UPF 209 returns an allocated multicast IP address for the session.

Step 232: MB-SMF 208 sends MBS session establishment or update response to AMF 203 with MB-UPF information. The MB-UPF information may be used by the RAN node 202 to establish the N3 tunnel to transfer the data.

Step 233: AMF 203 sends a N2 message to RAN node 202 to notify the upcoming switch. In the N2 message, AMF 203 may include the following information to help RAN node 202 prepare for the switch.

The information may include MB-UPF information such as ID or address, so that RAN node 202 may establish N3 tunnel with the MB-UPF 209 if N3 tunnel is not established yet.

The information may include UE ID such as 5G_GUTI or SUPI.

The information may include MBS service area indicating the area that the MBS session is serving for the multicast transmission.

The information may include Unicast PDU session ID and MBS session ID identifying the sessions that are affected by the switch, so that RAN node 202 is able to adjust its radio resource correspondingly.

The information may include Multicast IP address along with TMGI to identify the multicast group.

The information may include a NAS message which is also included that may be forwarded to UE 201 as response to the switch request in step 221 (the contents of this NAS message are detailed in step 236).

The information may include QoS mapping information. In addition, the QoS mapping information may be provided to the RAN node 202 to indicate the QoS mapping between QoS of MBS session and the QoS of the PDU session for unicast. This mapping information may be from MB-SMF 208/SMF 204 or PCF 206 and forwarded by the AMF 203. With the mapping information, the RAN node 202 is able the configure radio resource within access network for data transfer to UE 201 to meet the QoS requirement.

Step 234: once RAN node 202 receives the N2 message from AMF 203, AMF 203 may contact MB-UPF 209 to establish or update the N3 tunnel for the multicast session. AMF 203 may provide RAN node information, tunnel ID to identify the N3 tunnel, and the indication that the N3 tunnel is shared or group based for multicast transmission. It is possible that RAN node 202 needs to establish the N3 tunnel regardless of whether the MBS session exists or not, which implies that RAN node 202 may join the multicast group for sending data to the UE 201. It is also possible that RAN node 202 already joins the shared N3 tunnel, but not for the requesting UE. in other words, RAN node 202 is transferring the multicast data to other UEs. In this case, RAN node 202 does not need to contact MB-UPF 209.

Step 235: RAN node 202 also adjusts its radio resource to prepare for the switch.

Step 236: RAN node 202 sends an RRC message to UE 201 including the NAS message carrying the delivery mode switch response from AMF 203. The response may include the following information: TMGI, multicast IP address, multicast session ID, or context information. The context information may be multicast service area, QoS information (e.g., 5QI, QoS flow ID, maximum data rate), application information (e.g., application ID, OSId and OSAppId), or starting time point. Note that from UE 201 perspective, an MBS session is the same as a unicast session but associated with an IP multicast address and TMGI. However, a MB-UPF 209 may send the multicast data flow to one or more RAN nodes over the shared N3 tunnel, and each RAN node 202 may send the multicast data to one or more UEs within its cell using the radio resource.

Step 237: an application layer signal is from the UE 201 to notify the content provider (e.g., AF 210) about the coming switch about when it may start for which application, while the unicast data transfer continues. Here there is application layer signaling between UE and AF 210.

Step 238: After UE 201 starts receiving data through multicast session, the AMF 203 notifies SMF 204, which further tells UPF 205 to block/suspend mapping the traffic to the unicast PDU session even if the unicast PDU session is kept active. The traffic could be identified by the application information provided by UE 201 in step 222. In addition, it is possible that that block/suspension is associated with a valid time period. Alternatively, the UE 201 could send a new NAS message (e.g. PDU Session Update—Flow Suspend), that indicates to the network the details of a flow that it no longer wants to receive via unicast since it is receiving equivalent data via multi-cast. The flow may be described as a combination of an IP 5-tuple, an Application ID, an OSId or OSAppId(s). The network may use this information to block any DL traffic that matches the description. Later, when the UE 201 wants to reactive the unicast flow, the UE 201 may send a new NAS message (e.g. PDU Session Update—Flow Resume), that indicates to the network (e.g., a core network entity, such as a server or network function) that flow, or data, should no longer be blocked at the UPF 205. The information in NAS message from UE 201 has some indication to the network on what to do.

Note that, for the switching scenario from unicast to broadcast, the MBS session may have an indication to indicate to network functions and UEs that the session is for broadcast, and there may be no multicast IP address associated with the session. However, TMGI is still used to identify the broadcast group. The shared N3 tunnel is identified by TMGI and tunnel ID.

Additional logic may be implemented in the Core Network Functions involved in the procedure to determine whether the switch should take place, e.g. based on NF local policies. For example, the switch may be performed only if it is determined that the UE 201 is anticipated to remain in a certain geographical area for certain amount of time, or only if explicit user consent is provided. In that case, the response in step 236 may include a corresponding cause and a request for additional information and the UE 201 may re-initiate the procedure providing the necessary information in the multicast request context.

Alternatively, UE 201 may also initiate the switch process by sending a request over the user plane path, e.g., a unicast PDU session. Note that, this user plane solution is mainly applicable for the scenario that the multicast session has been already established. FIG. 8 shows the user plane method:

Step 240: as a pre-requisite step, a unicast session is established, and data is transferred over the unicast session between UE 201 and AF 210 through network.

Step 241: UE 201 decides to switch the data transfer to multicast from unicast. This could be triggered by several factors as disclosed herein, such as the information or events (e.g., Events Triggering Switching from Unicast to Multicast).

Step 242: it is assumed that the multicast group exists, so the UE 201 encapsulates the request to join the multicast group into a data packet and sends it to UPF 205 over the unicast PDU session. UE 201 may provide the UE ID, TMGI, multicast IP address if it knows, and application information (e.g., application ID, OSId and OSAppId(s)) indicating which application data may be switched to multicast. Alternatively, the UE 201 may send an MLD report to the UPF 205 to join the multicast group. The UE 201 may provide the multicast IP address in the report or let the MBMF 207/MB-SMF 208 provide the multicast IP address.

Step 243: upon receiving the data packet, UPF 205 sends a N4 notification to SMF 204. The notification includes the join request from the UE 201.

Step 244: SMF 204 sends the join request to MBMF 207. If SMF 204 does not know MBMF information, it can communicate with UDM (e.g., UDM/PCF 206) or NSSF for help. Alternatively, SMF 204 may forward the join request to MB-SMF 208, and then MB-SMF 208 contacts MBMF 207 to start the MBS session management procedure (e.g., establish or update) for UE's request.

Step 245: MBMF 207 initiates the authorization for UE 201 for getting MBS service, and optionally the secondary authentication and authorization process with AF 210 if it is required specific to UE 201, the application, the MBS service, or a combination of these.

Step 246~step 247: MB-SMF 208 send MBS session update request to MB-UPF 209 since the MBS session for multicast is already created. The update operation may include adding an additional RAN node and a shared N3 tunnel to enable the multicast data transfer to the newly joined UE 201.

Step 248: MB-SMF 208 sends switch notification to AMF indicating that the MBS session is ready to transfer data by multicast to the UE 201, which includes UE ID, starting time instant for the switch, the MB-UPF address or ID, and MBS session ID and QoS information. This information may be passed to RAN node 202 so that RAN node 202 is able to adjust the radio resource for the switch. For example, RAN node 202 may suspend or remove the radio resource allocated for the unicast transmission, and allocate radio resource for the upcoming multicast transmission.

Steps 249~step 250: AMF 203 exchanges the PDU session update request/response with SMF 204 about the session that UE 201 is currently using for unicast data transfer.

Step 251~step 252: SMF 204 then communicates with UPF 205 over N4 to update the unicast session context. The update may include changing the packet detection rule at UPF 205 by blocking or suspending the application data (identified by application ID, OSId and OSAppId(s)) over the unicast PDU session identified by session ID after a set period to allow the UE 201 time to switch to the multicast session.

Next several steps are the same as step 233~step 238 as shown in FIG. 7A-FIG. 7B in order to notify RAN node 202 as well as UE 201 to get them prepared for the upcoming switch.

Network Initiated Procedure

In addition to the UE initiated scenarios, network may also initiate the switch procedure from unicast to multicast for an application data flow, including the case that AF 210 initiates the switch by sending request to NF. The possible triggers have been discussed in above. FIG. 9 shows the procedure of network-initiated switch from unicast to multicast transmission.

Step 260: as a pre-requisite step, a unicast session is established, and data is transferred over the unicast session between UE 201 and AF 210 through network.

Step 261a: AF 210 sends a delivery mode switch request to MBMF 207 or AMF 203 if it decides to trigger the switch. If AF 210 knows which NF to contact, it may send request message directly to the AMF 203 or MBMF 207. AF 210 may reach MBMF 207 or AMF 203 via NEF 211 if necessary. In this case, NEF 211 may determine which AMF 203 or MBMF 207 to contact on behalf of AF 210. For example, NEF 211 communicates with UDM (e.g., UDM/PCF 206) to retrieve the subscription information, or NSSF for selecting the appropriate NFs. AF 210 may provide the following information in the request.

The information may include TMGI if the group is already formed. If TMGI is not provided, then the TMGI may be allocated during the rest of steps in the procedure (For example, MBMF 207 assigns a TMGI).

The information may include External group ID if those involved UE 201 already form a group at application layer.

The information may include Multicast IP address if multicast has been used. The information may include Unicast session IDs that are currently used for data transfer. The information may include Source IP address of the application data flow.

The information may include a list of UEs that may be switched to multicast transmission: it is possible that AF 210 wants to switch more than one UEs to a common multicast session to improve resource efficiency. In this case, AF 210 may provide a unicast session ID for each of those UEs.

The information may include application information such as application ID, OSId and OSAppId(s) to identify which application data may be switched to multicast.

The information may include desired time instant indicating when the AF 210 wants the switch to take effect.

Step 261b: alternatively, NF may want to start the switch due to the reasons/triggers disclosed herein, such as the information or events (e.g., Events Triggering Switching from Unicast to Multicast).

Step 262: AMF 203 sends UE(s) a NAS message to notify UE 201 the switch decision. The NAS message may be a UE configuration update message, which may include the following information: unicast session ID, QoS parameters (e.g., data rate, latency and error rate), application information that may be switched to multicast, TMGI, multicast IP address, source IP address, MBS session ID and context information (such as MBS service area), or starting time instant of the switch. In addition, AMF 203 may indicate to UE 201 so that UE 201 may initiate the switch procedure as shown in FIG. 7A-FIG. 7B. If there are multiple UEs that may switch, AMF 203 may perform the step 263.

Step 263: AMF 203 follows steps 223~236 as shown in FIG. 7A-FIG. 7B including MBS session establishment/update, unicast session update, notifying RAN nodes to configure N3 tunnel between the RAN node 202 and MB-UPF 209. Note that it could be multiple UEs that are involved, as a result, multiple RAN nodes may be involved to serve each of UEs for multicast transmission. This include a NAS message (delivery mode switch notification) sent from AMF 203 to UE 201. In the notification, AMF 203 provides the following information to UE 201: unicast session ID, QoS parameters (e.g., data rate, latency and error rate), application information that may be switched to multicast, TMGI, multicast IP address, source IP address, MBS session ID and context information (such as MBS service area), or starting time instant of the switch.

Step 264: AMF 203 notifies the AF 210 that the switch configuration is done, and it is ready for starting the switch at the desired time instant.

RAN Initiated Procedure

As discussed in above, RAN node 202 in some scenarios may also initiate the switch procedure from unicast transmission to multicast transmission. Disclosed herein is subject matter about how a RAN node 202 can start the procedure to enable the switch from unicast to multicast transmission including option 1 or option 2.

Option 1: RAN node 202 sends an RRC message to notify UE 201 that it decides to initiate the switch, and then UE 201 initiates the switch following the procedures presented above.

Option 2: RAN node 202 sends an N2 message to AMF 203 requesting network to initiate the switch, which then follows the procedure presented herein, such as FIG. 8 with regard to Network Initiated Procedure. RAN node 202 may also indicate the cause of the switch, such as limited unicast radio resource or UE 201 entering multicast service area. This option may be useful for the scenario that multiple UEs served by the RAN node 202 are switching to multicast for the same application. RAN node 202 may provide UE ID to network for each of UEs involved, and request network to assign a TMGI to form a group if multicast group is not formed yet.

Methods of Switch from Multicast to Unicast Delivery

This section presents the procedures of switching data transmission from multicast to unicast.

Events to Trigger Switch Process from Multicast to Unicast

A UE 201 may request to switch from multicast to unicast for an application due to one of the following five reasons, among other things.

First, it could be triggered by the UE's own measurements on data transfer over the multicast session fall below the requirement (such as data rate, error rate and latency) and decides to switch to unicast session for the same application data. This measurement could be from the application layer, or at the transport layer.

Second, it could be triggered when the UE 201 moves out of the MBS service area of the MBS session, so it has to switch to unicast.

Third, it could be trigged when a user on a UE 201 wants to continue receiving data traffic after an ad-hoc multicast group has disbanded and indicated via a GUI on the UE 201. For example, a gaming application prompts a user to continue the gaming session after all other members left the multicast session.

Fourth, a user could intentionally/manually exit a broadcast or multicast group (e.g. based on a GUI request).

Fifth, UE subscription profile is changed to not allow UE 201 to use the MBS service.

The switch from multicast to unicast could be initiated by the core network entity, including a request from AF 210 or external SCS/AS via NEF 211. This request may be initiated for the following three reasons, among other reasons.

First, the content provider finds that the number of users receiving data on the multicast session decreases, and it becomes less efficient to continue multicast from resource management aspect.

Second, the content provider finds out that the data transfer performance degrades and cannot meet requirement at application layer, it may decide to unicast data with more performance guarantee.

Third, the network functions such as MB-SMF 208, MB-UPF 209, AMF 203, or NWDAF finds or predicts that the data transfer performance within core network cannot meet requirement, or that UE 201 moves out of MBS session service area. In addition, if there is only one remaining UE receiving the multicast traffic, the network may switch the UE 201 to using unicast session for better mobility handling of the traffic in case the UE 201 moves.

The switch from multicast to unicast could be initiated by the RAN node 202 as well. For example, RAN node 202 measures some parameters (e.g., data rate, error rate, or latency) for the ongoing multicast session and finds that the performance is below a threshold or may degrade below a threshold. The RAN node 202 may determine the need to switch the application data transfer to unicast session that can guarantee the performance requirements.

Disclosed herein are triggers to switch flows from unicast to multicast and triggers to switch flows from multicast to unicast. It should be understood that although a particular trigger might be discussed in the context of switching a flow from unicast to multicast/broadcast, it can also apply to switching a flow from multicast/broadcast to unicast. It should also be understood that although a particular trigger might be discussed in the context of switching a flow from multicast/broadcast to unicast, it can also apply to switching a flow from unicast to multicast/broadcast.

UE Initiated Procedure

When a UE 201 wants to switch the data transfer from a multicast session to a unicast session, different approaches can be used, such as control plane method or user plane method.

FIG. 10 shows the procedure which UE 201 sends the switch request over the control plane path.

Step 270 as a pre-requisite step, a multicast session is established, and UE 201 is receiving data over the multicast session from content provider.

Step 271: at some point, UE 201 decides to switch data transmission to unicast.

Step 272: UE 201 sends a NAS message (e.g., service request, or session establishment request/update) to AMF 203 indicating that it intends to switch to unicast. In the NAS message, UE 201 may provide the following information.

The information may include UE ID, such as 5G-GUTI, SUPI, or S-NSSAI(s).

The information may include Unicast session ID and session context, such as QoS profile, session type, session continuity mode, or service continuity mode.

The information may include DNN which may indicate the data network that originates or terminates the data for multicast and unicast.

The information may include application information, such as application ID indicating which application data may be delivered by multicast/unicast. Moreover, this may include of OSId or OSAppId(s).

The information may include desired (e.g., threshold) time instant that UE 201 would like to start receiving data from multicast session, e.g., when the switch takes effective. This could be associated with a certain time period, indicating that UE 201 may receive the data over multicast during the time period.

The information may include External group ID, which may be an application layer ID that may be converted to internal group by network to identify the multicast group for the UE 201.

The information may include, if MBS session for multicast is already established, UE 201 also provides the TMGI, multicast IP address, or MBS session ID information.

The information may include S-NSSAI(s) which may indicate the network slice that UE 201 connects to for the multicast data transfer.

The information may include the desired time instant that UE 201 would like to start receiving data from multicast session, e.g., when the switch takes effect.

The information may include unicast credentials. The UE 201 provides additional credentials needed to establish or join the multicast service or group.

Cause that Triggers the Requested Switch

Step 273: AMF 203 forwards the switch request to MBMF 207. If AMF 203 does not know MBMF information, it may resort to UDM/NSSF to obtain MBMF information.

Step 274: MBMF 207 request MB-SMF 208 to update the MBS session context reflecting that UE 201 may not receive data over the multicast session.

Step 275~step 276: MB-SMF 208 contacts MB-UPF 209 to update the MBS session context considering that UE 201 may switch to unicast session. MB-UPF 209 may decide to terminate the N3 tunnel to RAN node 202 by removing the RAN node 202 address if the requesting UE is the only UE 201 under the RAN node active on the MBS session.

Step 277: MB-SMF 208 returns the response to MBMF 207 indicating that MBS session update is completed.

Step 278: MBMF 207 sends switch response to AMF 203 indicating that the MBS session is ready for finishing multicast data transfer to the requesting UE.

Step 279: AMF 203 selects a SMF 208 if it is required to establish a new unicast PDU session.

Step 280: AMF 203 initiates PDU session establishment or update process with the selected SMF 204 and UPF 205.

Step 281: AMF 203 sends a notification to AF 210 about the coming switch, so that AF 210 knows when to start sending the specific application data to the unicast session anchor at UPF 205.

Step 282: AMF 203 also sends a N2 message to RAN node 202 including a NAS message (switch response) that may be forwarded to UE 201 by the RAN node 202. The N2 message includes UE ID, unicast session ID and corresponding session context information, QoS profile, UPF address/ID, MBS session ID with TMGI or multicast IP address, time instant that switch starts. Optionally, the NAS message may be a PDU Session Modification from the network that indicates that the unicast flow is established and provides rules, or policies, for the unicast flow. In addition, the QoS mapping information may be provided to the RAN node 202 to indicate the QoS mapping between QoS of the MBS session or the QoS of the PDU session for unicast. This mapping information may come from the MB-SMF 208/SMF 204 or PCF 206 and forwarded by the AMF 203. With the mapping information, the RAN node 202 is able the configure radio resource within access network for data transfer to UE 201 to meet the QoS requirement.

Step 283: given the information received in step 282, RAN node 202 adjusts the radio resource to prepare for the switching. The N3 tunnel may be terminated in case that the UE 201 is the only one under the RAN node 202 that is using the MBS session.

Step 284: RAN node 202 forwards the switch response from AMF 203 to UE 201, which includes the unicast session ID and context information as described in step 282.

Step 285: after UE 201 starts receiving data over the unicast data session, the MBS session may be deactivated or released under the RAN node 202 and MB-SMF 208/MB-UPF 209. MB-UPF 209 may keep record showing that the multicast data flow for the specific application may not be sent to the RAN node 202. Note that the MBS session may be kept active at other MB-UPFs and RAN nodes for different UEs that keep receiving the application data from the multicast session.

Alternatively, the procedure may be implemented such that the PDU establishment/update procedure in step 280 may be initiated prior to the MBS update step 273-step 278.

FIG. 11 shows the procedure which UE 201 sends the switch request over the user plane path.

Step 290: as a pre-requisite step, a multicast session is established, and UE 201 is receiving data over the multicast session from content provider.

Step 291: at some point, UE 201 decides to switch data transmission to unicast.

Step 292: UE 201 encapsulates a LEAVE request message in a PDU data packet to indicate that it intends to leave a multicast group. UE 201 also provides the source IP address, TMGI and multicast IP address.

Step 293: once MB-UPF 209 identifies the request to leave the multicast group, it sends a N4 notification to MB-SMF 208 with MBS session ID, UE ID, the source IP address, TMGI and/or multicast IP address.

Step 294: MB-SMF 208 forwards the UE's leave request to MBMF 207.

Step 295: MB-SMF 208 at the same time request MB-UPF 209 to update the MBS session by potentially change the MBS session context information, e.g., remove/deactivate the N3 tunnel information connecting to the RAN node 202.

Step 296: MB-UPF 209 returns the session update response to MB-SMF 208.

Step 297: MB-SMF 208 sends MBS session update notification to AMF 203 and MBMF 207 respectively to indicate that the MBS session update is completed for the switch.

The next several steps are the same as discussed herein with reference to FIG. 10 (e.g., step 279-step 285).

Network Initiated Procedure

FIG. 12 shows the procedure of network-initiated switch from multicast to unicast including the scenario that AF 210 initiates the procedure by sending request to NF.

Step 300: as a pre-requisite step, a multicast session is established, and UE 201 is receiving data over the multicast session from content provider.

Step 301a: AF 210 as content provider sends a delivery mode switch request to MBMF 207 or AMF 203 to indicate its intention that switch some application data transmission from multicast to unicast. AF 210 may reach NF via NEF 211 if necessary. AF 210 may provide the following information.

The information may include TMGI and multicast IP address to identify the multicast group.

The information may include MBS session ID and context information that are being used for multicast.

The information may include information of the unicast session that are currently being used for data transfer, such as session ID, N6 tunnel ID, or QoS parameters.

The information may include source IP address of the application data flow.

The information may include list of UEs that may be switched to unicast transmission. It is possible that AF 210 determines the need to switch more than one UEs from a common multicast session to individual unicast session. In this case, AF 210 may provide a unicast session ID for each of those UEs. If the unicast session is not established yet for a certain UE, network may establish a new unicast session for the UE 201.

The information may include application information such as application ID, OSId, or OSAppId(s) to identify which application data may be switched to unicast.

The information may include desired time instant indicating when the unicast transmission starts.

Step 301b: in addition to trigger by AF 210, NFs may also decide to switch from multicast to unicast.

Step 302: Network performs steps 273-step 283 as shown in FIG. 10 to enable the switch from multicast to unicast.

Step 303: AMF 203 sends delivery mode switch notification to UE 201(s) so that UE 201 may prepare for the switch. In the notification, AMF 203 provides the following information to UE 201: unicast session ID, context information, QoS parameters, application information that may be switched to unicast, TMGI, multicast IP address, source IP address, MBS session ID, or starting time instant of the switch.

Step 304: at last, network returns response to requesting AF 210.

RAN Initiated Procedure

In case that RAN node 202 wants to initiate the switch from multicast to unicast transmission for an application data flow, there are two options that are similar to the methods presented above, e.g. the RAN node 202 may send a notification message to individual UE to start switch or send a N2 message to AMF 203 to start the switch.

A QoS parameter notification control has been specified in 5G system to indicate whether notifications are requested from the NG-RAN when the GFBR can no longer (or can again) be guaranteed for a QoS Flow during the lifetime of the QoS Flow. Notification control may be used for a GBR QoS Flow if the application traffic is able to adapt to the change in the QoS (e.g. if the AF 210 is capable to trigger rate adaptation). Upon receiving a notification from the NG-RAN that the GFBR can no longer be guaranteed, the AMF 203/SMF 204 may forward the notification to the PCF (e.g., UDM/PCF 206). Unless the PCF 206 indicates differently, the AMF 203/SMF 204 uses NAS signaling (that is sent transparently through the RAN) to inform the UE 201 about changes in the QoS parameters (e.g., 5QI, GFBR, or MFBR) that the NG-RAN is currently fulfilling for the QoS Flow. It is disclosed to evolve the use of the QoS parameter Notification control or to define a new QoS parameter for service delivery mode control. This new QoS parameter may be named for example "Delivery Mode Control" or "Delivery Notification control." The evolved notification control parameter or the new Delivery Mode control parameter may be used by the core network (e.g., a network server or other entity) to indicate whether notifications are requested from the NG-RAN when QoS requirement can no longer be met using the currently configured delivery mode, or to request delivery mode switch from MBMS user service (Multicast/Broadcast) to Unicast service, or to request delivery mode switch from unicast service to MBMS user service (Multicast/Broadcast). Upon receiving a notification from the NG-RAN, the AMF 203/SMF 204 may forward the notification to the PCF 206 or to the BM-SC/MBMF 207. Unless the PCF indicates differently, the BM-SC, or the BM-SC in collaboration with the SMF 204 reconfigures the UE 201 with a new delivery mode using NAS signaling. The core network may also reconfigures the RAN accordingly to align with the new delivery mode configured into the UE 201.

In addition, RAN node 202 may send a notification message to MB-UPF 209 through the N3 tunnel indicating to the MB-UPF 209 that no UE 201 under the RAN node 202 is still in the multicast group (e.g., receiving the application data over the multicast session), so that the MB-UPF 209 may stop sending the multicast application data over the N3 tunnel to this RAN node 202 in the future.

Switch from Shared MBS Traffic Delivery to Individual MBS Traffic Delivery with Handover Previous sections disclose methods of switching not due to the mobility, e.g., handover is not needed. In this section, the methods of switching between individual and shared MBS traffic delivery are discussed involved in the handover procedure. With reference to the handover procedures, the "source" is the RAN node that is currently connected with the UE and provides the UE access to the network, while the "target" is the RAN node anticipated or desired for UE to connect with to provide the UE access to the network.

When a UE 201 receiving the multicast data is moving from the source RAN node to the target RAN node, the UE 201 or source RAN node may trigger the delivery mode switch procedure along with the handover procedure. This trigger may be because the target RAN node does not support MBS service or UE 201 is out of an MBS service area. In addition, an NF such as AMF 203, MBMF, or MB-SMF 208/SMF 204 may trigger the switch as well after being notified by the source RAN node about the handover. For example, the SMF 204 may find out that the target RAN node is out of MBS service area when initiating the PDU session establishment or modification procedure. In case that MBSF is managing the MB-SMF 208 or SMF 204 with respect to the MBS service, the MBSF may trigger the switch.

With the shared traffic delivery method, the UE 201 receives the multicast data over an MBS PDU session through the source RAN node. After a switch to individual traffic delivery method, the UE 201 may receive the data over a PDU session through the target RAN node. Significant issues may include the following. A first issue with regard to how to link the MBS PDU session for shared delivery method and the PDU session for individual delivery method to make sure the QoS requirement is met. Or a second issue with regard to how to prevent the potential data loss during the handover/switch process.

For the first issue, it may be assumed that different SMFs 204 manage the MBS PDU session and the PDU session respectively. During the handover, when the UE 201/SMF 204 establishes a new PDU session or updates an existing PDU session for the individual delivery method, the SMF 204 may send the QoS mapping information between MBS session and PDU session as well as the PDU session information to the source RAN node using N2 SM message, so that the source RAN node may be able to map the QoS of MBS session to QoS of PDU session. This may be used by the source RAN node during the switch especially when the target RAN node does not support MBS service, e.g., it is not aware of any MBS QoS. Specifically, based on the MBS QoS, source RAN node may tell the target RAN node about the QoS requirement of one or more QoS flows in PDU session for individual delivery method. Then the target RAN node may be able to adjust RAN resource for data transfer to UE 201 based on the QoS of the PDU session for the individual delivery. The source RAN node could transfer such information directly to the target RAN node via Xn interface or via N2 interface to AMF 203 which forwards the information to the target RAN node. The PDU session information may include PDU session ID, QFIs, QoS parameters of the QFIs such as 5QI, max data rate, max aggregate flow rate, or QoS characteristics, such as error rate or latency.

Furthermore, UE 201 may also be provided with such QoS mapping, so it could provide the QoS requirement of the PDU session established for the individual traffic delivery based on the mapping to the target RAN node. The benefit is that the UE 201 could provide the mapping at the beginning of handover process to the target RAN node, so that the switch process could be done faster. MB-SMF 208/SMF 204 managing the MBS session or the source RAN node could provide the QoS mapping to the UE 201. The QoS mapping information may include QFI of MBS PDU session and QFI of PDU session for the individual traffic delivery with the same QoS requirement, 5QI of MBS PDU session and 5QI of PDU session for the individual traffic delivery.

With regard to the second issue, handover usually completes before the delivery mode switch process. Regardless whether the target RAN node supports MBS service or not, during the time period between completion of handover and completion of switch, the UE 201 may not be able to receive data because handover is done while the switch is not finished yet, e.g., the PDU session for individual traffic delivery is not established yet or not activated yet. One possible approach is to let source RAN node continue to receive and store the MBS data during the time period and forwards the data to the target RAN node. When the PDU session is ready for individual traffic delivery to UE 201, e.g., switch is complete, the target RAN node notifies the source RAN node, and the source RAN node stops MBS data storage and forwarding. The source RAN node and target RAN node may exchange data storing and forwarding information during the handover process. The information may include the following: how often the source RAN node should forward the data, the max amount of data the source RAN node may store for the UE 201 after handover, how long the source RAN node may keep the data if it does not hear anything from the target RAN node, what forwarding mechanism is used for data forwarding. The possible forwarding mechanism could be directly to the target RAN node or to the UPF 205 which then sends the data to the target RAN node via N3 tunnel, source RAN node pushes the stored data or target RAN node retrieves the data from source RAN node. In addition, the 2 RAN nodes may need to establish a data forwarding channel which is transparent to 5GC.

An alternative method is to make the PDU session ready for the individual delivery during the handover. In other words, 5GC needs to establish or modify the PDU session for the individual delivery during the handover. When the handover is completed, target RAN node may be able to deliver the data to UE 201 using the individual delivery method over the associated PDU session. In this sense, the session management process may be integrated into the handover process.

Switch from Individual MBS Traffic Delivery to Shared MBS Traffic Delivery with Handover When switching from individual delivery method to shared delivery method is coupled with handover, the same issues need to be addressed, such as 1) how to link the MBS PDU session for shared delivery method and PDU session for individual delivery method to make sure the QoS requirement is met; or 2) how to prevent the potential data loss during the handover/switch process.

For the first issue, if the source RAN node supports the MBS service, then the same approach disclosed in previous paragraphs can be applied, e.g., the source RAN node is provided with QoS mapping between PDU session and MBS session and the MBS session information, so that the source RAN node is able to tell the target RAN node how to set up the RAN resource to deliver the multicast data to the UE 201 to meet the QoS requirement. If the source RAN node does not support MBS service, the source RAN node is not able to map the QoS of individual delivery method to the QoS of shared delivery. In this case, UE 201 may be provided with the QoS mapping information, and thus UE 201 may provide the target RAN node with the necessary QoS information to configure the RAN resource to send multicast cast. An alternative method is to handover the PDU session associated with the source RAN node for individual delivery method to the target RAN node. In other words, the target RAN node may have two N3 tunnels: 1) one N3 tunnel may be used for individual delivery before the switch, and 2) another N3 tunnel may be used for shared delivery after the switch. It is possible that different UPFs terminate the N3 tunnels. Moreover, the application server or AF 210 may be aware of these changes with the notification from 5GC, and send the data to the appropriate UPF 205 accordingly.

For the 2nd issue, the same approach may be applied compared to what is discussed in the previous paragraph.

User Interface

The parameters used in delivery mode switch process could be provisioned by the end user (UE), network operator, or application content provider through a user interface. In addition, the switching UE, content provider or network operator could retrieve and display the statistics through the user interface. The user interface may be implemented for configuring or programming those parameters with default values, as well as enabling or disabling the switch process. An exemplary user interface is shown in FIG. 13.

Definitions and Abbreviations

The following Table 1 shows a list of acronyms that may appear in the above description. Unless otherwise specified, the acronyms used herein refer to the corresponding term listed below:

TABLE 1

| | |
|---|---|
| Network Function (NF) | A NF is a processing function in a network, which has defined functional behavior and defined interfaces. A NF can be implemented either as a network element on a dedicated hardware, or as a software instance running on a dedicated hardware, or as a virtualized function instantiated on an appropriate platform, e.g. on a cloud infrastructure. |
| MBMS Bearer Service | The service provided by the PS Domain to MBMS User Services to deliver IP multicast datagrams to multiple receivers using minimum network and radio resources. |
| MBMS User Service | The MBMS service provided to the end user by means of the MBMS Bearer Service and possibly other capabilities. |
| MBS service area | The area within which data of one or multiple MBS session(s) are sent. |
| 5GC Individual MBS traffic delivery | 5G CN may receive a single copy of MBS data packets and delivers separate copies of those MBS data packets to individual UEs via per-UE PDU sessions, hence for each such UE one PDU session is required to be associated with a multicast session |
| 5GC shared MBS traffic delivery | 5G CN may receive a single copy of MBS data packets and delivers a single copy of those MBS data packets to a RAN node. For 5GC shared MBS traffic delivery, the RAN node either delivers a single copy of MBS data packets over radio to a set of UEs (PTM) or delivers separate copies of MBS data packets over radio to individual UEs (PTP). |
| 5GC | 5G Core Network |
| AF | Application Function |
| AMF | Access and Mobility Management Function |
| API | Application Program Interface |
| APN | Access Point Name |
| AS | Application Server |
| BM-SC | Broadcast-Multicast Service Center |
| CM | Connection Management |
| CN | Core Network |
| CP | Control Plane |
| DL | Downlink |
| EPC | Evolved Packet Core |
| EPS | Evolved Packet System |
| GUTI | Globally Unique Temporary UE Identity |
| HSS | Home Subscriber Server |
| IE | Information Element |
| IMSI | International Mobile Subscriber Identity |
| LTE | Long Term Evolution |
| eMBMS | Evolved Multimedia Broadcast Multicast Service |

TABLE 1-continued

| | |
|---|---|
| MBMF | Multicast and Broadcast Management Function |
| MBS | Multicast/Broadcast Service |
| MM | Mobility Management |
| MME | Mobility Management Entity |
| MooD | MBMS operation on Demand |
| NAS | Non-Access Stratum |
| NEF | Network Exposure Function |
| NF | Network Function |
| NIDD | Non-IP Data Delivery |
| NSI | Network Slice Instance |
| NSSF | Network Slice Selection Function |
| NWDAF | Network Data Analytics Function |
| PCC | Policy and Charging Control |
| PCF | Policy Control Function |
| PDN | Packet Data Network |
| PDU | Packet Data Unit |
| P-GW | PDN Gateway |
| QoS | Quality of Service |
| NG-RAN | New Generation Radio Access Network |
| RAT | Radio Access Technology |
| RM | Registration Management |
| SSC | Session and Service Continuity |
| S-GW | Serving Gateway |
| SM | Session Management |
| SMF | Session Management Function |
| S-NSSAI | Single Network Slice Selection Assistance Information |
| TMGI | Temporary Mobile Group Identity |
| UE | User Equipment |
| UDM | Unified Data Management |
| UL | Uplink |
| UP | User Plane |
| UPF | User Plane Function |

It is understood that the entities performing the steps illustrated herein, such as FIG. 6-FIG. 12, may be logical entities. The steps may be stored in a memory of, and executing on a processor of, a device, server, or computer system such as those illustrated in FIG. 1F or FIG. 1G. Skipping steps, combining steps, or adding steps between exemplary methods disclosed herein (e.g., FIG. 6-FIG. 12) is contemplated.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless network communications or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—delivery mode switch for multicast and broadcast service in a network, such as 5G—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for delivery mode switch for multicast or broadcast service in a network, such as 5G. A method, system, computer readable storage medium, or apparatus provides for determining a triggering event has occurred at one or more of a user device (e.g., UE), a network device (e.g., core network device), content provider system, or RAN node, wherein the triggering event indicates a need to switch between a first one and a second one of unicast mode, multicast mode, and broadcast mode; and initiating, based upon the occurrence of the triggering event, a switch from the first one of the unicast mode, the multicast mode, and the broadcast mode to the second one of the unicast mode, the multicast mode, and the broadcast mode for transmitting data to the user device. A system, computer readable storage medium, or apparatus provides for switching between at least two unicast mode, multicast mode, and broadcast mode for transmitting data to a user device over a 5G network. Further comprises: transmitting, from the user device and to a network entity, a request to switch from unicast mode to multicast node; performing, using the network entity, a MBS service authorization and MBS session management configuration; notifying an application server and RAN node about change in mode from unicast mode to multicast mode from the user device; or receiving, by the user device, information from the network for joining a multicast group. The request may include one or more of types of data comprising: an identifier of the user device; a session identifier and flow descriptor for the current unicast data transfer; an indication of the data network that originates and/or terminates the data for multicast and unicast; an indication of the network slice that the user device uses for the unicast data transfer; an application identifier indicating application data will be delivered by multicast/unicast; multicast session identifier; Quality of Service information; a changeover time identifier; multicast credentials: the UE provides additional credentials needed to establish or join the multicast service or group; a multicast request context; a multicast IP address: the identity that identifies the multicast session/group; other MBS session context information; a TMGI identifying the multicast group that UE wants to join; or a Multicast Session identifier or Reference identifier. The response message that comprises the indication of authorization for the requesting UE to use the MBS, further comprises a Temporary Mobile Group Identity (TMGI) or internet protocol multicast address to identify the multicast group. Received information may include QoS mapping information between MBS session and PDU session, and other session information. Delivery mode switching information may be received via an N2 interface from a source RAN node. After handover completes but switch not completed, source RAN node may store the multicast data temporarily, and forward the data to the target RAN node after switch is completed. The request may be a NAS request message. A system, computer readable storage medium, or apparatus provides for determining a triggering event has occurred at a user device; or initiating, by the user device and based upon the occurrence of the triggering event, a switch from the unicast mode to the multicast mode. A system, computer readable storage medium, or apparatus provides for transmitting, from the user device and to a network entity, a request to switch from unicast mode to multicast node; performing, using the network entity, a MBS service authorization and MBS session management configuration; notifying an application server and RAN node about change in mode from unicast mode to multicast mode from the user device; or receiving, by the user device, information from the network for joining a multicast group. As disclosed herein, in addition to a unicast to multicast switch, there may any types of switches between unicast, multicast, or broadcast. All combinations in this paragraph and the below paragraph (including the removal or addition of steps) are contemplated in a manner that is consistent with the other portions of the detailed description.

A method, system, computer readable storage medium, or apparatus provides for receiving, by a network function, a Non-Access Stratum (NAS) message from a requesting user equipment (UE); sending, by the network function, a request to a multicast and broadcast management function (MBMF) to determine whether the requesting UE is authorized to use the multicast service or multicast/broadcast service (MBS); in response to sending the request to the MBMF, receiving a response message that comprises an indication of authorization for the requesting UE to use the multicast service or multicast/broadcast service (MBS); determining that an MBS session is not available; based on the MBS session not available and the indication of authorization, sending an MBS session establishment message or modification message; in response to the sending of the MBS session establishment message or modification message, receiving a response with multicast/broadcast-user plane function (MB-UPF) information; or based on the MB-UPF information, sending a message (e.g., N2 message) to a radio access node to notify the radio access node of an upcoming switch from a unicast mode to multicast mode switch for transmitting data to the requesting UE. Unicast means 5GC sends 1 copy of packet to individual UE. So, multicast refers to 5GC sends 1 copy of packet to multiple UEs that joins the group. From RAN perspective, multicast from 5GC to UE could be done by unicast between RAN and UE or multicast between RAN and UE. The method, system, apparatus, or computer-readable storage medium may provide for detecting a triggering event; and based on the triggering event, initiating the switch from the unicast mode to the multicast mode, which comprises the sending the request to the multicast and broadcast management function (MBMF) to determine whether the requesting UE is authorized to use the multicast service or multicast/broadcast service (MBS). The triggering may occur at one or more of the requesting UE or a RAN node. The triggering event may be any number of events disclosed herein, which may include reaching a threshold number with regard to the disclosed information, which may be one type of information (e.g., error rate) or a combination of information (e.g., error rate and bandwidth). The method, system, apparatus, or computer-readable storage medium may provide for receiving information via an N2 interface from a source RAN node; and in response to receiving the information via the N2 interface, forwarding the information to a target RAN node. All combinations in this paragraph and the below paragraph (including the removal or addition of steps) are contemplated in a manner that is consistent with the other portions of the detailed description.

A method, system, computer readable storage medium, or apparatus provides for receiving data from a radio access node on a unicast packet data unit session; determining to use multicast for data transfer; in response to the determining to use multicast for data transfer, sending a message to request a delivery mode switch from unicast to multicast; based on the message to request the delivery mode switch from unicast to multicast, receiving a NAS message carrying a delivery mode switch response; and sending an application layer signal to notify a network device about an upcoming switch from a unicast to a multicast session. The application layer signal to notify the network device indicates the when the multicast session will start and for which application, while the unicast data transfer continues. In response to sending the application layer signal, receiving data over the multicast session.

What is claimed:

1. A method performed by a wireless transmit/receive unit (WTRU) in a network, the method comprising:
   receiving information about a service, the information about the service comprising a session identifier and first information associated with a first service area;
   determining to join the service based on the first information associated with the first service area, wherein the first information comprises an indication that the WTRU is in the first service area;
   based on the determining to join the service, sending a first non-access stratum (NAS) message to request to join the service;
   based on the first NAS message to request to join the service, receiving a second NAS message, wherein the second NAS message is a response comprising second information of a second service area associated with the service;
   receiving data associated with the service from a first radio access node in a multicast session when in the second service area;
   switching from the multicast session to a unicast session when the WTRU is in the first service area; and
   using the unicast session to receive data for the service from a second radio access node.

2. The method of claim 1, wherein the first NAS message is a packet data unit (PDU) session establishment or a packet data unit (PDU) session modification.

3. The method of claim 1, wherein the first information comprises application information indicating an identifier of an application identifier associated with the service.

4. The method of claim 1, wherein the first NAS message service is sent to an access and mobility management function.

5. The method of claim 1, wherein the first information comprises a multicast session identifier (ID) for the service, wherein the multicast session is established before joining the service.

6. The method of claim 1, wherein the WTRU receives the second NAS message via a radio resource control (RRC) message from an access and mobility management function.

7. The method of claim 1, wherein the first information comprises quality of service information.

8. The method of claim 1, wherein the first information comprises a multicast session service area.

9. The method of claim 1, wherein the first information comprises a temporary mobile group identity (TMGI).

10. A wireless transmit/receive unit (WTRU) that switches to multicast or unicast service in a network, the WTRU comprising:
   a processor; and
   a memory coupled with the processor, the memory storing executable instructions that when executed by the processor cause the processor to effectuate operations comprising:
   receiving information about a service, the information about the service comprises a session identifier and first information associated with a first service area;
   determining, by the WTRU, to join the service based on the first information associated with the first service area, wherein the first information comprises an indication that the WTRU is in the first service area:
   based on the determining to join the service, sending a first non-access stratum (NAS) message to request to join the service:
   based on the first NAS message to request to join the service, receiving a second NAS message, wherein the second NAS message is a response comprising second information of a second service area associated with the service;
   receiving data associated with the service from a first radio access node in a multicast session when in the second service area:
   switching from the multicast session to a unicast session when the WTRU is in the first service area: and
   using the unicast session to receive data for the service from a second radio access node.

11. The WTRU of claim 10, wherein the first NAS message is a packet data unit (PDU) session establishment or a packet data unit (PDU) session modification.

12. The WTRU of claim 10, wherein the first information comprises application information indicating an identifier of an application identifier associated with the service.

13. The WTRU of claim 10, wherein the first NAS message service is sent to an access and mobility management function.

14. The WTRU of claim 10, wherein the first information comprises a multicast session identifier (ID) for the service, wherein the multicast session is established before joining the service.

15. The WTRU of claim 10, wherein the WTRU receives the second NAS message via a radio resource control (RRC) message from an access and mobility management function.

16. The WTRU of claim 10, wherein the first information comprises quality of service information.

17. The WTRU of claim 10, wherein the first information comprises temporary mobile group identity (TMGI).

18. A computer readable storage medium storing computer executable instructions that when executed by a computing device cause the computing device to effectuate operations comprising:
   receiving, by a wireless transmit/receive unit (WTRU), information about a service, the information about the service comprises a session identifier and first information associated with a first service area;
   determining, by the WTRU, to join the service based on the first information associated with the first service area, wherein the first information comprises an indication that the WTRU is in the first service area:
   based on the determining to join the service, sending a first non-access stratum (NAS) message to request to join the service;
   based on the first NAS message to request to join the service, receiving a second NAS message, wherein the second NAS message is a response comprising second information of a second service area associated with the service;
   receiving data associated with the service from a first radio access node in a multicast session when in the second service area:
   switching from the multicast session to a unicast session when the WTRU is in the first service area: and
   using the unicast session to receive data for the service from a second radio access node.

19. The computer-readable storage medium of claim 18, wherein the first information comprises temporary mobile group identity (TMGI).

20. The computer-readable storage medium of claim 18, wherein the WTRU receives the second NAS message via a radio resource control (RRC) message from an access and mobility management function.

* * * * *